Jan. 6, 1948.   R. C. ENGELKEN   2,434,201
CONTROL SYSTEM FOR MULTIPROGRAM PROJECTORS
Filed Feb. 23, 1944   9 Sheets-Sheet 1

RICHARD C. ENGELKEN, DEC'D
By MARY A. ENGELKEN, EXECUTRIX
INVENTOR

BY
ATTORNEYS

RICHARD C. ENGELKEN, DEC'D
By MARY A. ENGELKEN, EXECUTRIX
INVENTOR

ATTORNEYS

Jan. 6, 1948.  R. C. ENGELKEN  2,434,201
CONTROL SYSTEM FOR MULTIPROGRAM PROJECTORS
Filed Feb. 23, 1944  9 Sheets-Sheet 3

RICHARD C. ENGELKEN, DEC'D
By MARY A. ENGELKEN, EXECUTRIX
INVENTOR

BY
ATTORNEYS

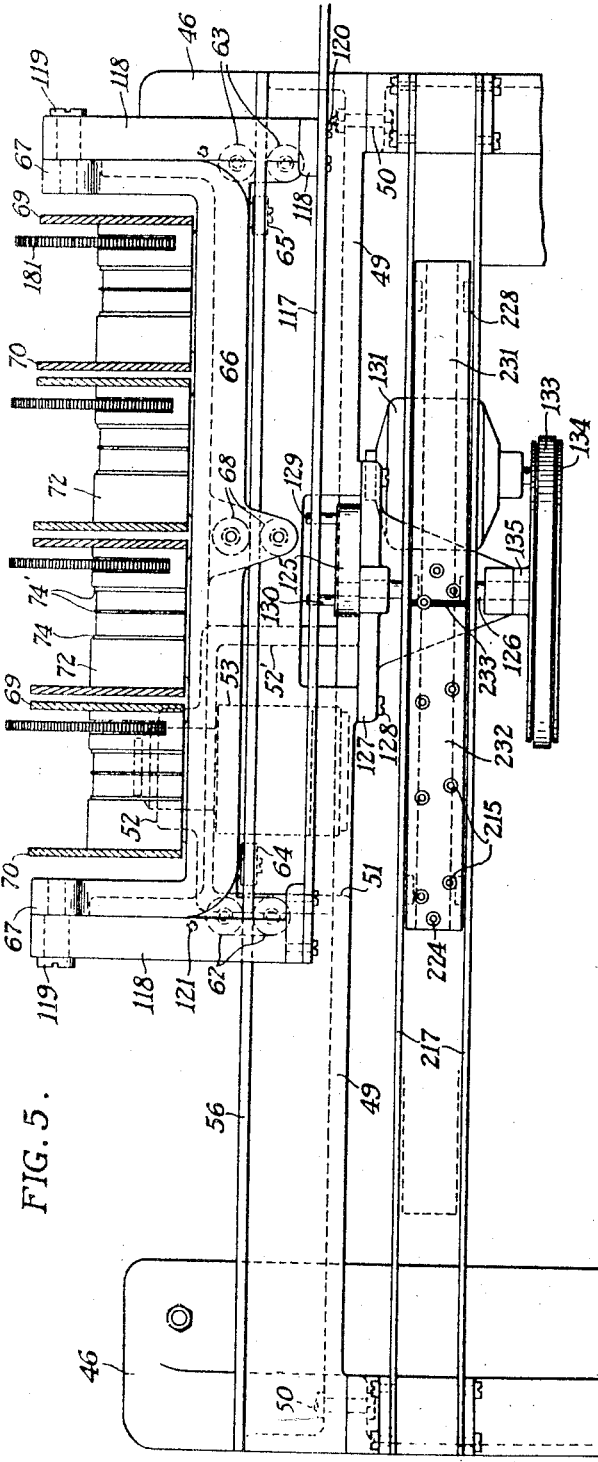

Jan. 6, 1948.   R. C. ENGELKEN   2,434,201
CONTROL SYSTEM FOR MULTIPROGRAM PROJECTORS
Filed Feb. 23, 1944   9 Sheets-Sheet 5

RICHARD C. ENGELKEN, DEC'D
By MARY A. ENGELKEN, EXECUTRIX
INVENTOR
BY
ATTORNEYS

Jan. 6, 1948.  R. C. ENGELKEN  2,434,201
CONTROL SYSTEM FOR MULTIPROGRAM PROJECTORS
Filed Feb. 23, 1944  9 Sheets-Sheet 6
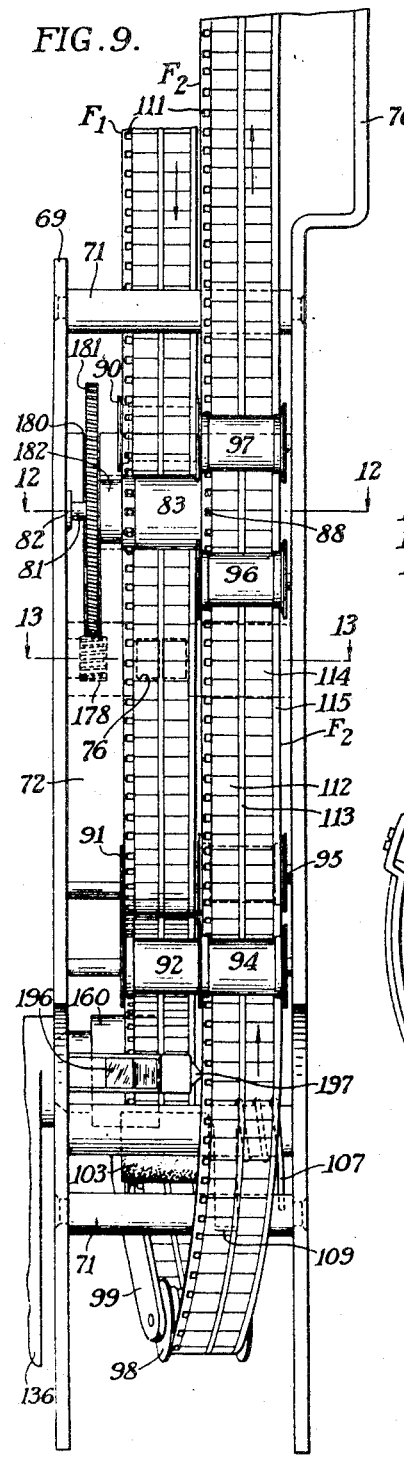
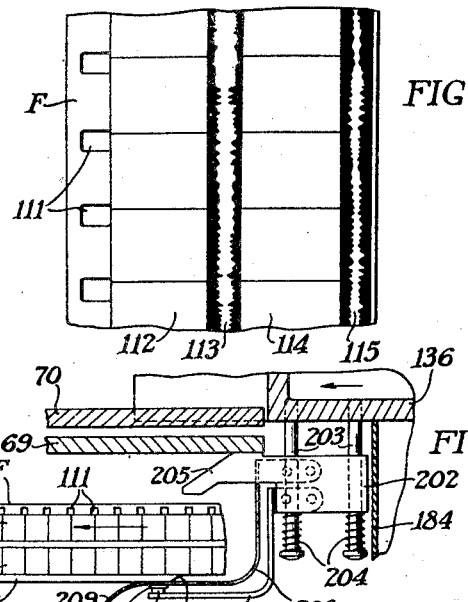
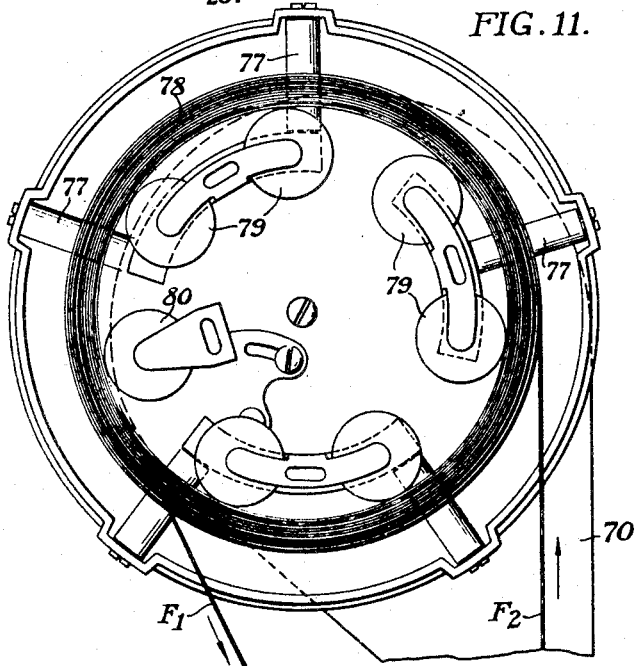
RICHARD C. ENGELKEN, DEC'D
By MARY A. ENGELKEN, EXECUTRIX
INVENTOR
BY
ATTORNEYS Jan. 6, 1948.  R. C. ENGELKEN  2,434,201
CONTROL SYSTEM FOR MULTIPROGRAM PROJECTORS
Filed Feb. 23, 1944  9 Sheets-Sheet 7
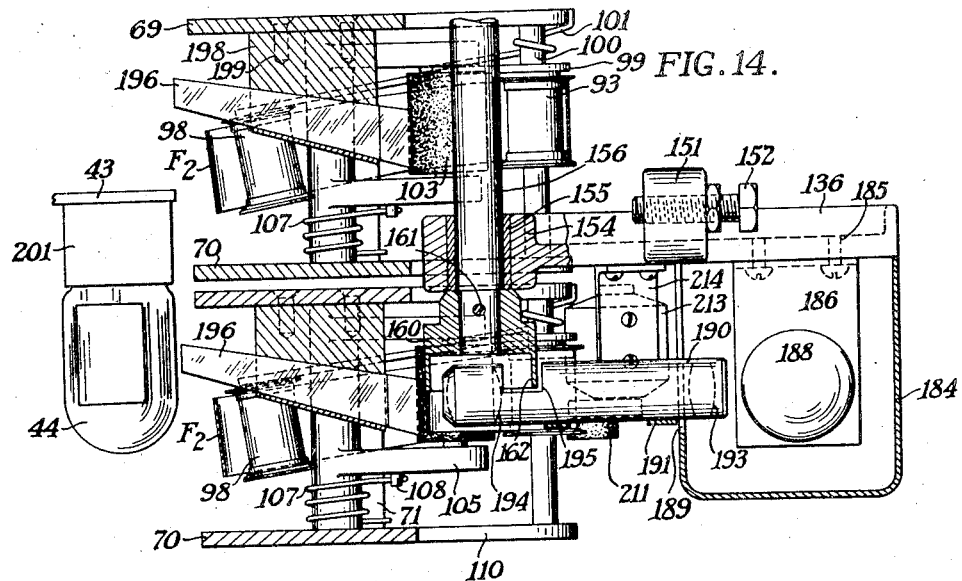
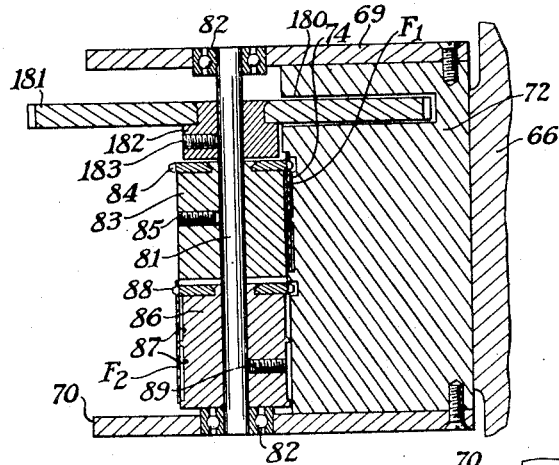
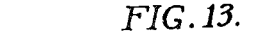
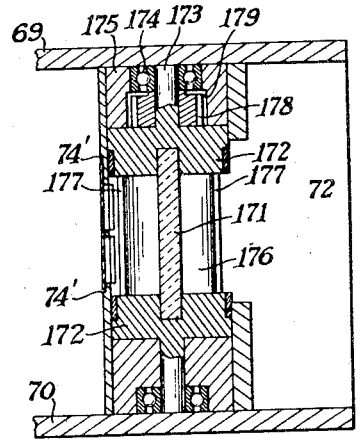
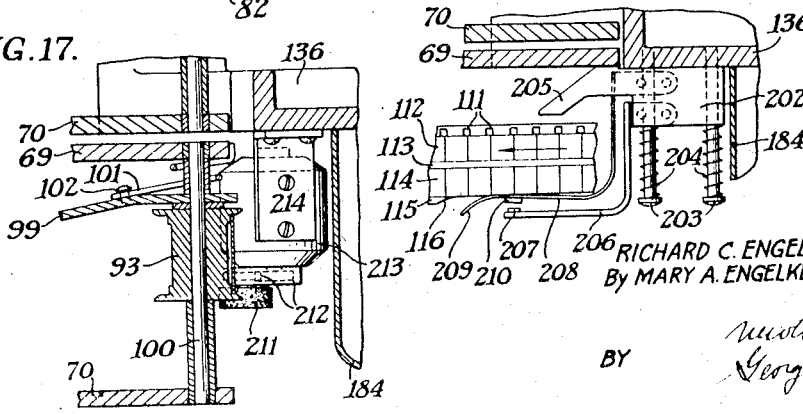
RICHARD C. ENGELKEN, DEC'D
By MARY A. ENGELKEN, EXECUTRIX
INVENTOR
BY George A. Gillett
ATTORNEYS

Patented Jan. 6, 1948

2,434,201

UNITED STATES PATENT OFFICE 2,434,201

CONTROL SYSTEM FOR MULTIPROGRAM PROJECTORS

Richard C. Engelken, deceased, late of Clifton, N. J., by Mary A. Engelken, executrix, Clifton, N. J.

Application February 23, 1944, Serial No. 523,509

27 Claims. (Cl. 88—17)

The present invention relates to a control system for a multi-program projector and more particularly to a control system whereby a complete coin-initiated cycle including selection and reproduction of a film program is automatically performed.

Although control systems for automatic selective motion picture projectors are known, they are found to be unsatisfactory or impractical for one or more reasons. In general, known control systems are complicated and/or extremely critical in operation and consequently require considerable attention and maintenance to maintain satisfactory operation.

The primary object of the present invention is the provision of a control system for automatically supervising the cycle of a selective multi-program projector and which is simple in construction and operation and which performs its fully automatic control in spite of certain unusual or abnormal conditions.

Another object of the invention is the provision of a selector control means particularly suited for controlling relative movement of a pair of members to a plurality of predetermined positions.

A further object of the invention is the provision of a selector means comprising a plurality of contacts each corresponding to relative predetermined positions of a pair of relatively movable members and including a conductor element having an insulated portion, both for engaging said contacts.

Another object of the invention is the provision of a selector operating circuit supervised by said selector control means of the invention.

A further object of the invention is the provision of an assembly control means or assembly control circuit for supervising the movement and operation of a film advancing assembly.

Still another object of the invention is the provision of an assembly operating circuit supervised by said assembly control circuit according to the invention.

Still another object of the invention is the provision of switches and circuits for controlling movement of the film advancing assembly and for controlling other functions of the projector with respect to the position of said film advancing assembly.

A still further object of the invention is the provision of film operated control means for insuring against operation of the projector under abnormal conditions and for controlling the reproduction and/or projection cycle of the projector.

Other objects of the invention include the provision of holding and interlocking circuits and relays which insure proper sequence of the functions of the projector and which protect against any improper sequence of operations.

Still other and further objects of the invention will be apparent to those skilled in the art from the description which follows.

The aforementioned objects of the invention are embodied in a control system for a multi-program projector comprising an optical system, a carriage means supporting a plurality of film handling units each adapted to contain a film strip bearing one or more film programs, a carriage operating means, a film advancing assembly and/or an assembly operating means, said control system in turn comprising a selector control circuit, a selector operating circuit, an assembly control circuit, assembly operating circuits, a film advance circuit, a projection control circuit, a protective control circuit, projection operating circuits, and/or holding or interlocking circuits arranged for insuring proper sequence of projector operations and for preventing improper sequence thereof. Said selector control circuit preferably comprises a plurality of contacts each corresponding to a projector film program, a conductor bar having an insulated portion for engaging said contacts, and either branch of a direction control circuit for determining the direction in which the projector carriage is moved. The assembly operating circuits include one operating circuit for causing movement of the film advancing assembly into operative position and a second operating circuit for causing movement of said film advancing assembly from operative position to inoperative position. The projection control circuit may be interrupted responsive to proper arrangement of a film program for reproduction and to the completion of a film program or to said protective control circuit in turn responsive to normal movement of the juxtaposed film program within a film handling unit. Said circuits may according to the invention be employed in various combinations and the invention is not limited to the illustrated embodiment thereof but has a scope defined by the claims hereof.

Reference is hereby made to the accompanying drawings wherein similar reference characters designate similar elements and wherein:

Fig. 5 is a fragmentary plan view of my multi-program projector and illustrates particularly the carriage and carriage operating means thereof.

Figs. 6 and 7 are fragmentary front elevations of the notched bar on the carriage means and constituting a part of the carriage operating means. Fig. 7 illustrating the change in position of the notched bar after 180° rotation of the rotatable indexing arm.

Fig. 9 is a rear elevation of a film handling unit and showing the arrangement of guide rollers and sprockets therein.

Fig. 10 is an enlarged front elevation of a portion of the film strip carrying two series of picture images and two corresponding sound tracks.

Fig. 11 is a side elevation of the non-rewind coil and mounting assembly preferably located at the top of the film handling unit.

Fig. 12 is a fragmentary horizontal section through the sprocket of the film handling unit and taken on the line 12—12 of Fig. 9.

Fig. 13 is a horizontal section through the optical compensator of the film handling unit taken on the line 13—13 of Fig. 9.

Fig. 14 is a horizontal fragmentary section through the film advancing assembly and a pair of film handling units and shows particularly the arrangement of the elements of the sound reproducing and optical system.

Figs. 15 and 16 are fragmentary horizontal sections through a portion of the film advancing assembly and film handling units and showing the two positions of the film operated switch member which is moved to said positions by relative positions of the film handling units and film advancing means and by notches in the edge of the film programs.

Fig. 17 is a fragmentary horizontal section through the film advancing assembly and a pair of film handling units and shows the co-operation of the protective control means with a film program.

Figures 1, 2:
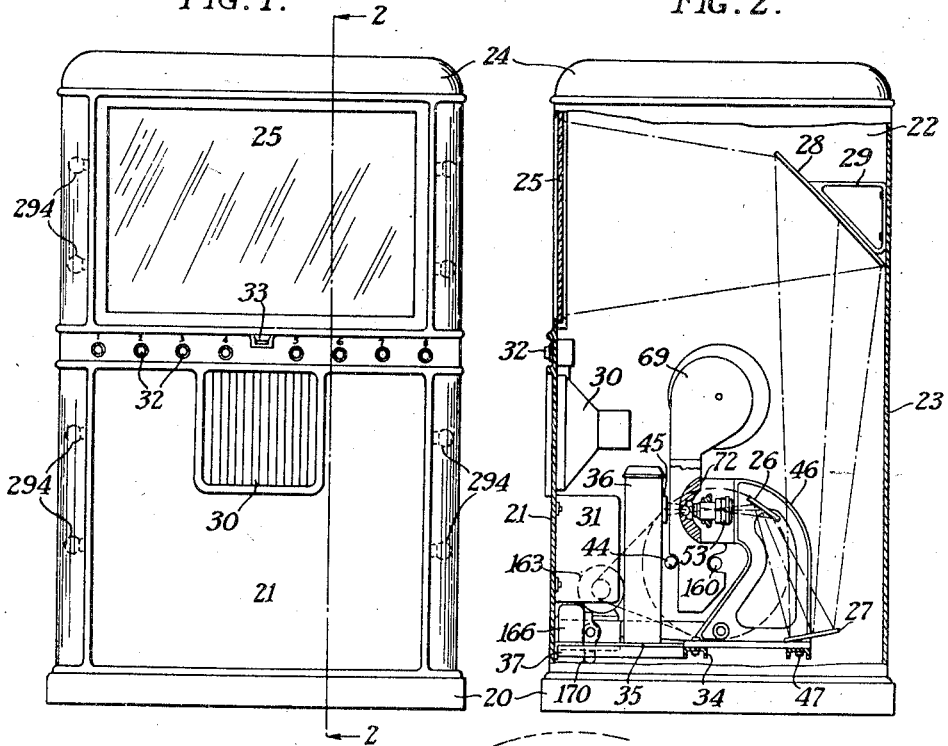
Fig. 1 is a front elevation of a suitable cabinet for the multi-program projector of the invention.
Fig. 2 is a vertical section taken on the line 2—2 of Fig. 1 and including an end view of my multi-program projector mechanism.

Although the illustrated embodiment of the invention relates to a film strip bearing two series of motion picture photographic images and laterally adjacent variable areas sound tracks, it is to be understood that many features of the invention are not limited to a plurality of film programs on a single film strip. The term "film program" as used herein refers either to a single series of picture images, a single sound track, or to a plurality of series of pictures and sound tracks or both. In other words, a multi-program projector according to the invention may be for pictures only or for sound only, or for both sound and picture programs. Although the multi-program projector is shown as being enclosed and facing the rear of the cabinet, the invention is not limited to enclosing of the multi-program projector or to any particular arrangement thereof within a cabinet or casing. The terms "front" and "rear," except as expressly referred to the cabinet, are used herein with respect to the multi-program projector which is considered to face in the direction of propagation of the image or picture light beam there through.

*Cabinet, frame and accessories*

According to the illustrated embodiment the multi-program projector is housed in a cabinet having a base 20, a front wall 21, side walls 22, a rear wall 23 and a top 24. The image beam from the projector is preferably reflected by one or more mirrors onto a rear view projection screen 25 mounted within an aperture in the upper portion of front wall 21. As shown, the projector may be directed toward the rear of the cabinet and mirrors 26, 27 and 28 are arranged therein, mirror 28 being mounted upon a bracket 29 on rear wall 23, to direct the image beam onto said screen 25. A loud speaker 30 and the amplifier 31 of the sound reproducing system may also be mounted upon the front wall 21 of the cabinet.

A plurality of manually operable devices or push buttons 32 are mounted across the front of the cabinet on wall 21 and are related in a known manner with a coin slot 33 also preferably on the front of the cabinet.

The projector proper is mounted within the cabinet upon a pair of cross beams 34 which are supported from the base 20 or side walls 22 thereof. A supporting plate 35 is fastened to cross beams 34 and extends toward the front of the cabinet to support a lamphouse 36 and a channel beam 37 also extends toward the front of the cabinet for a purpose to be later described.

The lamphouse 36 has a bracket 38 supporting a socket 39 for a light source or incandescent lamp 40. A blower 41 is operated by a motor 42 and directs a blast of air upwardly through lamphouse 36 and through the perforated top thereof. A bracket 43 on the front wall of lamphouse 36 supports a photo-sensitive member or photo-electric cell 44. A condenser assembly 45 may be mounted in the front wall of lamphouse 36 or is located in any other suitable manner for directing a light beam onto the film in the projector gate.

End frames 46 are mounted at each end of the cross beams 34 and are fastened thereto by bolts 47. Each of said end frames has a bearing sleeve 48 in the lower portion thereof and each has an upper vertical face. A cross member 49 has a U-shaped cross section and has its ends fastened to the vertical faces of the end frames 46 by bolts 50. Said cross member 49 is provided with a square lens opening 51, see Figs. 3 and 4, and includes a collar 52 supported behind said opening 51 by angular supports 52', preferably integral with said member 49 and collar 52, see Figs. 4, 5 and 8. The objective assembly 53 is mounted in said collar 52 in alignment with condenser assembly 45, has a back element 54 and has a front element 55 extending through the opening 51 in cross member 49, see Figs. 3 and 8. A pair of parallel rails 56 and 57 are respectively fastened to the ends of cross member 49 by screws 58 and constitute the support for the carriage later to be described. An intermediate frame member 59 has its ends fastened to the cross beams 34 and is provided with a bearing sleeve 60.

The movable carriage

Figure 3:
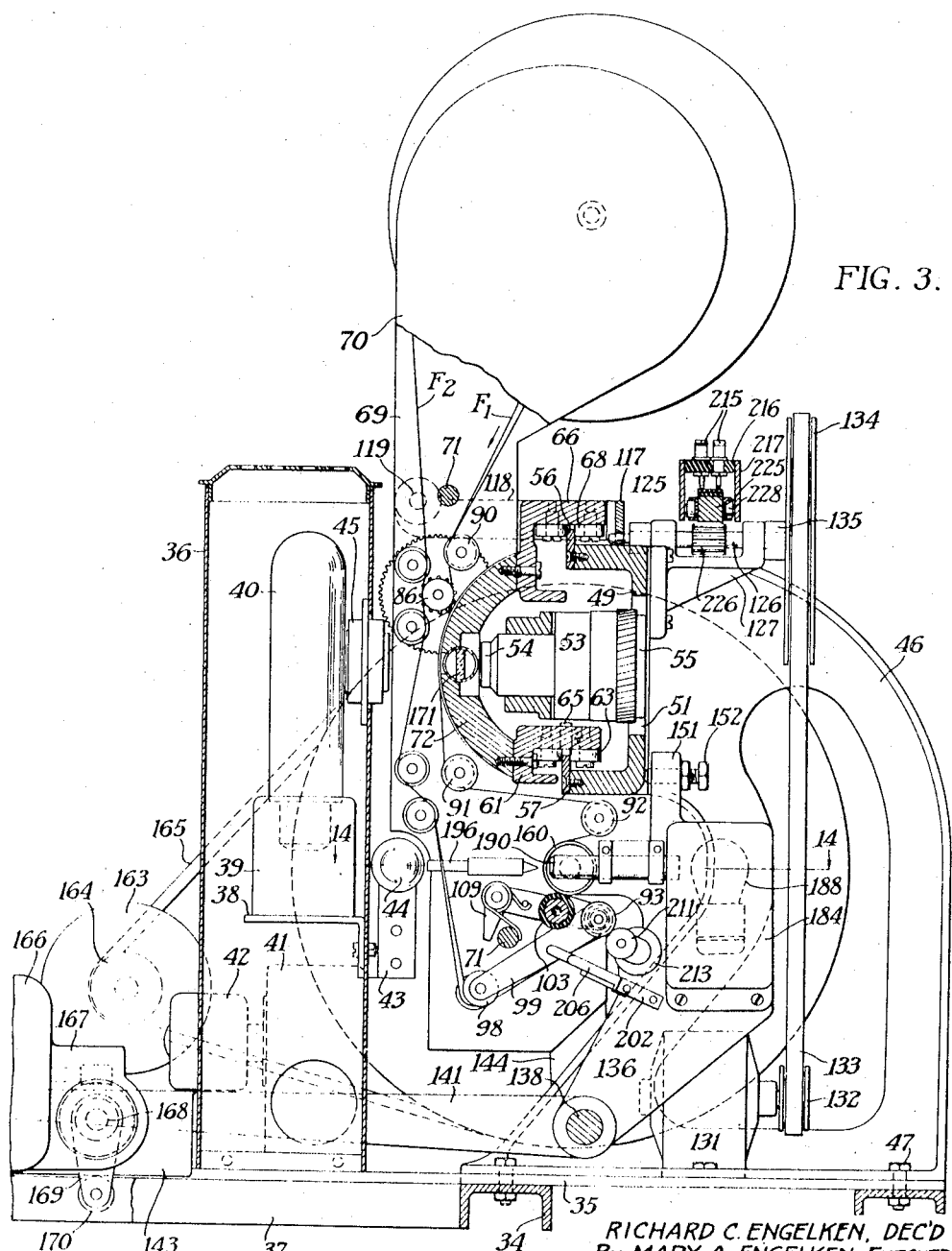
Fig. 3 is a vertical transverse section through the multi-program projector of the invention.
Figure 8:
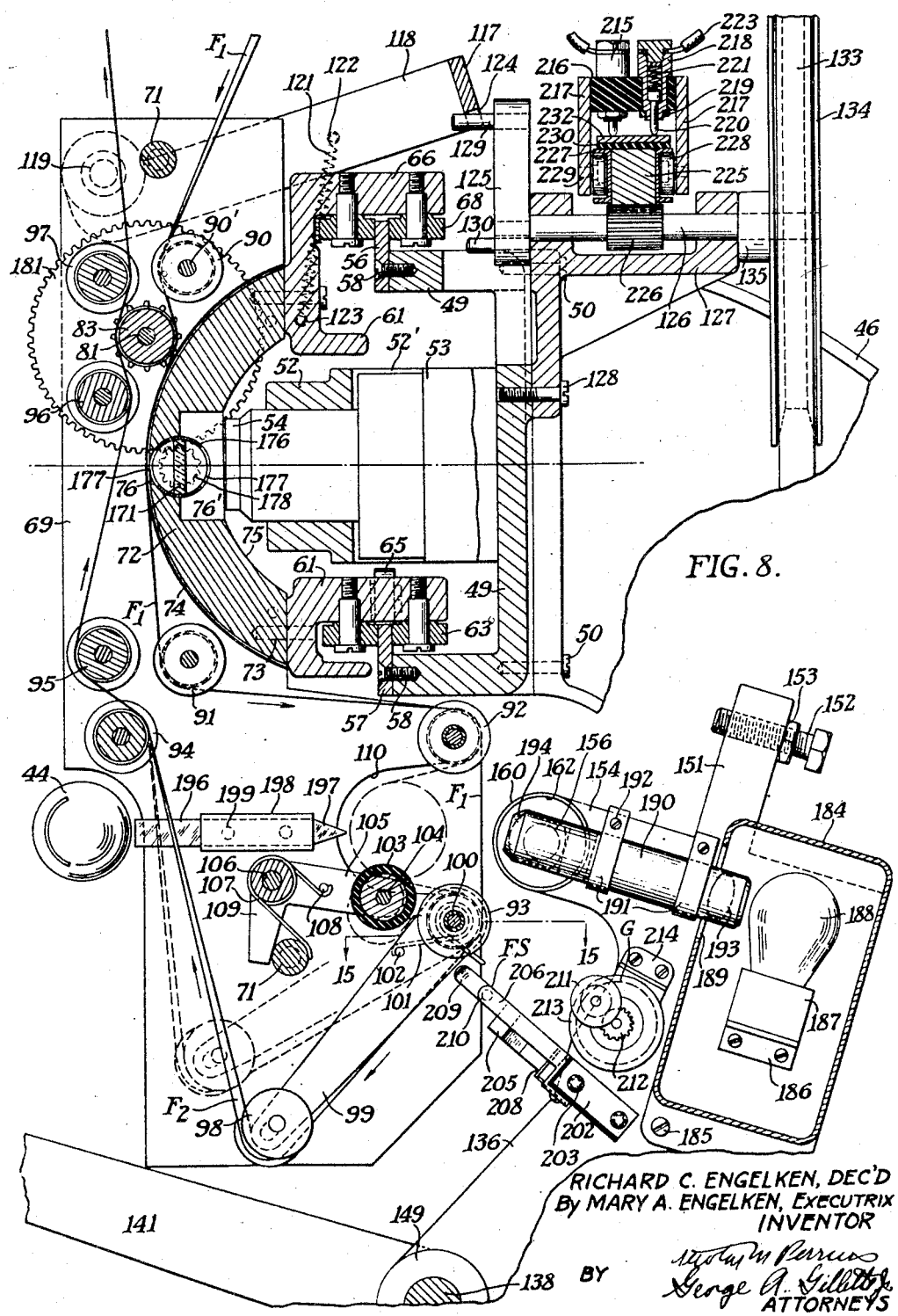
Fig. 8 is an enlarged fragmentary vertical section through the optical axis of the projector and showing particularly the operation of the carriage operating means and location of various elements on the movable film advancing assembly.

The movable carriage, see Figs. 3, 5 and 8, comprises a pair of parallel members mounted for movement along the aforementioned parallel rails 56 and 57 of the frame. The lower carriage frame member 61 carries two pairs of rollers for laterally guiding said frame member 61, one pair of rollers 62 being located at one end and another pair of rollers 63 being located at the other end of said carriage frame member 61. Rollers 64 and 65 are mounted on said carriage frame member 61 for rotation about horizontal axes and bear upon the top edge or rail 57. The upper carriage frame member 66 has rearwardly extending end arms 67 and carries a pair of rollers 68 for engaging opposite sides of the upper rail 56.

The film handling units

The various film programs for the multi-program projector are provided in film handling units, see Figs. 3 and 8 to 17, inclusive, which are detachably mounted upon said carriage or carriage means. Said film handling units may have any suitable construction but that disclosed herein has many advantages and unique features. Such a film handling unit has side walls 69 and 70 which are maintained in spaced relation by posts 71 and by a mounting member 72. Said mounting member 72 preferably has flat sides for abutting and attachment to the walls 69 and 70 and has a generally concavo-convex cross section. The ends of mounting member 72 are plane and are arranged for attachment to the carriage frame members 61 and 66 by means of bolts 73. The convex surface of said mounting member 72 has a film guiding recess or track 74 and the other side of said mounting member is provided with a concavity 75. Said mounting member 72 is provided with an aperture 76 having an enlarged portion 76' and extending from track 74 to concavity 75.

A non-rewind magazine is mounted upon the upper end of side wall 70 and comprises a plurality of radially arranged rollers 77 for engaging the edges of the film convolutions in a film coil 78 and a plurality of pairs of rollers 79 engaging the surface of the inner convolution of said film coil 78. An adjustable roller 80 also engages the inner convolution of said film coil 78. Such non-rewind assembly is of known form and is adapted in the usual way to deliver a film strip $F_1$ from the center of said film coil 78 and to take up a film strip $F_2$ onto the outer convolution of said film coil 78. While the non-rewind film assembly may be operated in the opposite direction satisfactorily, it has been found that operation in the direction shown is preferred.

The film strip or film program is withdrawn from and delivered to coil 78 by means of a sprocket assembly, best shown in Fig. 12, and comprising a shaft 81 journaled in ballbearings 82 in the respective side walls 69 and 70 and a sprocket drum 83 having teeth 84 and fastened to said shaft 81 by a set screw 85 and a second sprocket drum 86 provided with peripheral recesses 87, having teeth 88 and fastened to shaft 81 by a set screw 89. A roller 90 is rotatably mounted on a shaft 90' extending from side wall 70 and directs the film strip $F_1$ onto sprocket 83 from whence the film strip $F_1$ passes through the film guiding track 74 in mounting member 72 and past the gate aperture 76. Other fixed idler rollers 91, 92, 93, 94, 95, 96 and 97 direct the film downwardly and upwardly in the film handling unit. A film roller 98 is mounted for rotation about a skew axis on an arm 99 having one end rotatably mounted on the shaft 100 and also supporting the roller 93. A coil spring 101 has one end engaging a pin 102 on arm 99 and its other end engaging the side wall 69 so as to bias said arm 99 and roller 98 to move downwardly and tension the film strip within the film handling unit.

A second biased roller 103 is preferably covered with a friction material and is mounted upon a shaft 104 between a pair of arms 105 journaled on a shaft 106 extending between the side walls 69 and 70. A coil spring 107 has one end engaging a pin 108 in one of arms 105 and its other end engaging one of posts 71. The action of spring 107 holds the extension 109 of arm 105 against said post 71.

The side walls 69 and 70 are provided along one edge in the lower portion thereof with circular recess 110 and which permit the entry of a film advancing member for driving engagement with the film strip and, in a manner to be explained, to move the film strip into a curved path. The function of biased roller 98 is to tension the film strip and draw the portion $F_1$ thereof into a straight line between said rollers 92 and 93, see Fig. 8. The curved position of film strip $F_1$ as caused by the film advancing member is shown by the broken line in Fig. 8 and it is apparent that the movement of the film into this curved path presses the same against the reaction roller 103 and so that the film strip $F_1$ is frictionally gripped between the film advancing member and said roller 103, as shown in Fig. 3.

The film strip moving downwardly within the film handling unit has been designated as $F_1$ and the film strip moving upwardly has been designated as $F_2$. The film path from the coil 78 is as follows: Over roller 90, sprocket drum 83 and in engagement with sprocket 84, through the film guiding track 74 in mounting member 72 and past aperture 76, around fixed rollers 91, 92 and 93, around the canted and movable roller 98 which laterally displaces the film strip now designated as $F_2$, over rollers 94, 95, and 96, over sprocket drum 86 in engagement with sprocket 88 and over roller 97 to the outer periphery of the coil 78. In the lower portion of the film handling unit the film strips $F_1$ and $F_2$ are in laterally overlapping relationship, see particularly Fig. 9.

The foregoing arrangement of the film handling unit is advantageous for many reasons among which is the accurate location of the mounting member 72 upon the carriage frame and with respect to the objective assembly 53 and particularly with respect to the back element 54 thereof which extends into the concavity 75 of the mounting member 72. This compact arrangement of the film gate and the film handling assembly and the objective assembly 53 in alignment with the lamp 40 and condenser assembly 45 insures optimum projection results, particularly for image frames arranged in laterally adjacent series on the film strip.

The film strip F, see Fig. 10, is provided along one margin with perforations 111, has a series of picture images 112, a variable area sound track 113 adjacent thereto, a second series of picture images 114 and a second sound track 115 along the other margin thereof. Said film strip is also provided in a known manner with a structural variation at the conclusion of a picture and/or sound program thereon. Such structural variation may conveniently be provided as a notch 116 in the unperforated margin of the film, see Figs. 15 and 16.

Carriage operating means

The carriage operating means, according to the present invention, is unique in several respects and particularly in imparting simple harmonic motion to the carriage means and timed so that there is a rest period or zero movement as each film program on the carriage is moved into alignment or juxtaposition with respect to the optical system and in providing an accurate locating arrangement for the carriage by reason of cooperation between the members of the carriage operating means.

Such simple harmonic carriage operating means comprises broadly a notched or slotted member on the carriage and a rotatable member on the frame for engaging said notches or slots for intermittent movement of the carriage. The notched or slotted member is best shown in Figs. 3 and 5 to 8, inclusive, and comprises a bar 117 movably mounted upon the carriage as by a pair of arms 118 pivotally connected to the end arms 67 of the carriage frame by shouldered screws 119 and attached to the bar 117 by screws 120. The bar 117 extends beyond one of arms 118 as shown in Figs. 5, 6 and 7. Said bar 117 is biased to the position shown in Fig. 3 by springs 121, see Fig. 8, attached at one end to the arms 118 by pins 122 and attached at the other end to pins 123 on the carriage frame or carriage frame member 61. Notches 124, see Figs. 6 and 7, are provided along one edge of bar 117 and are each located to correspond to the position of a film program upon the carriage. In the illustrated embodiment there are four film handling units but since each unit carries two film programs there are eight notches in the bar 117 each corresponding to a film program. An extra notch is placed at the extreme right end of bar 117 to perform the locating function to be explained hereinafter.

Figure 4:
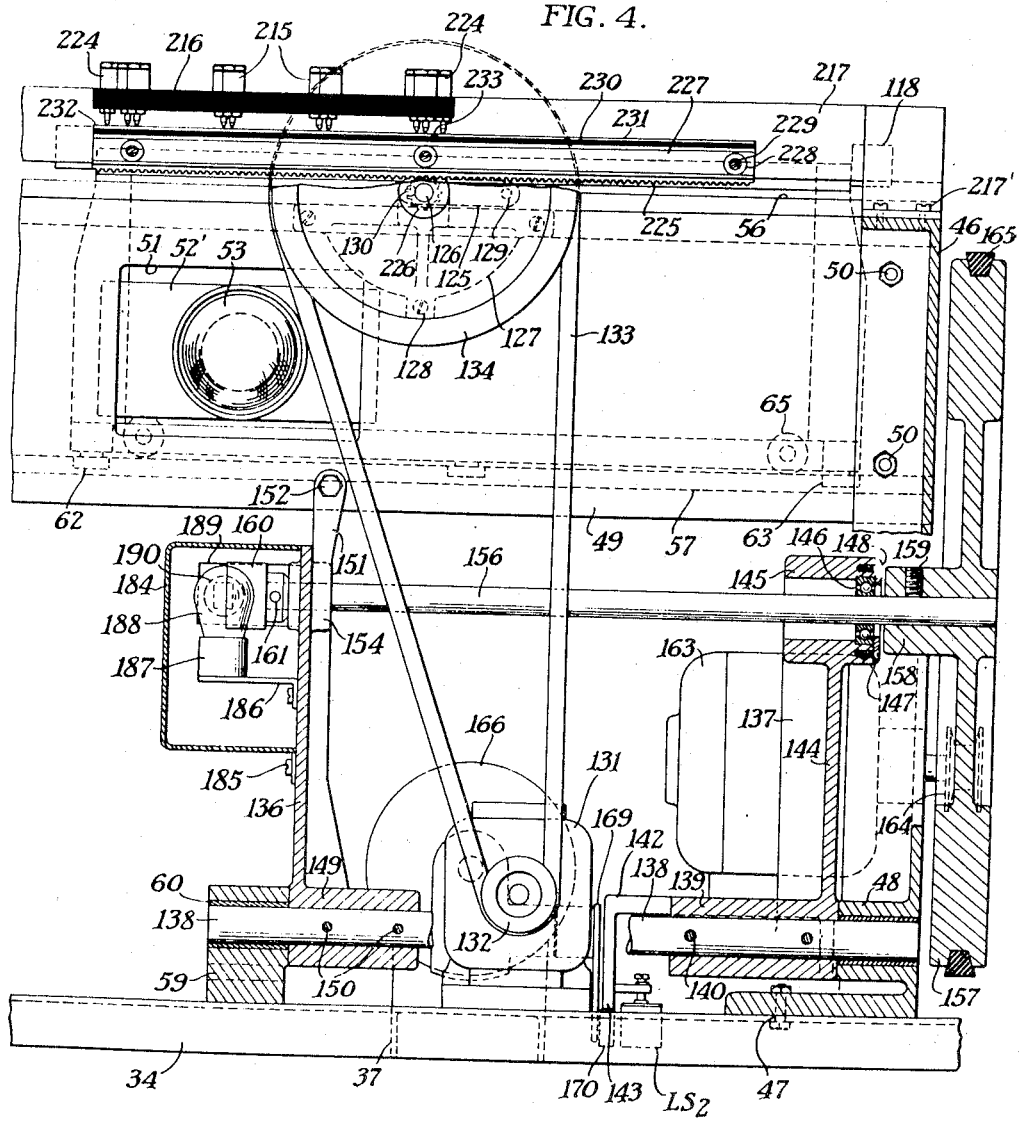
Fig. 4 is a fragmentary front elevation of the projector mechanism as viewed from the rear of the cabinet, see Fig. 2.

Actuation of the carriage and notched bar 117 is accomplished by a rotatable member. As shown, such rotatable member comprises an arm 125, see Figs. 3 to 8, inclusive, mounted upon a shaft 126 journaled in a bracket 127 which is fastened by screws 128 to the front of cross member 49, see Figs. 3, 4, 5 and 8. The arm 125, as best shown in Figs. 4, 5 and 8 has mounted on one end thereof a pin 129 and on the other end thereof a pin 130. The pin 129 is spaced from the axis of shaft 126 a greater distance than the pin 130 which is quite near the axis of shaft 126. However, the spacing between centers of said pins 129 and 130 is equal to the spacing between said notches 124. Rotation of shaft 126 may be accomplished in any known or suitable manner and according to the invention the carriage operating means is actuated by a motor 131 mounted on supporting plate 35 and having a pulley 132 and an endless belt 133 encircles said pulley 132 and a large diameter pulley 134 fastened to shaft 126 and spaced from one bearing of bracket 127 by a collar 135. Energization or operation of the indexing or carriage operating motor 131 causes rotation of shaft 126, arm 125 and pins 129 and 130 thereon. Said motor 131 is of known form, is reversible in operation and is preferably a permanent magnet type of motor which stops immediately upon de-energization.

When said motor 131 rotates in one direction the arm 125 and pins 129 and 130 thereon are rotated, for instance, in a counter-clockwise direction as viewed in Figs. 4 and 6, the pin 129 engages one of the notches 124 and raises the bar 117 against the action of springs 121 and simultaneously moves said bar 117 and the entire carriage and film handling units along rails 56 and 57 with simple harmonic motion. After 180° rotation of arm 125 and shaft 126 the pin 130 then engages the succeeding notch 124 to raise and move bar 117 and the carriage also with simple harmonic motion but moves the carriage a much shorter distance because of the shorter distance between the axes of shaft 126 and of the pin 130. Pin 129 is spaced from the axis of shaft 126 so that by 180° rotation thereof the bar 117 and the carriage means are moved to bring the nearer film program on the next film handling unit into juxtaposition with respect to the optical system and the spacing of pin 130 from the axis of shaft 126 is such that 180° rotation thereof in engagement with a notch 124 moves the bar 117 and the carriage means so as to bring the laterally adjacent picture series on the same film strip into alignment with the optical system. In other words, the carriage means is moved step by step successively to bring each picture series and/or sound track on a film strip into juxtaposition with respect to the picture and sound optics, each effective 180° rotation of pin 129 bringing another film handling unit into position and each effective rotation of the pin 130 bringing the other picture series and sound track of the same film into alignment.

Also, the notches 124 are arranged on bar 117 so that the disengagement of one pin and engagement of the other pin occurs when a picture series and/or sound track is in juxtaposition with the optical systems. When pins 129 and 130 are simultaneously within a pair of notches 124 the bias on bar 117 tends to hold said pins and the arm 125 in that position. In other words, the indexing motor 131 is de-energized at such time, in a manner to be later described, and the action of spring 121 on bar 117 compels simultaneous engagement of adjacent notches 124 with the pins 129 and 130 so as accurately to locate the carriage in such position. The extra notch in the right-hand end of bar 117 is for the purpose of providing this locating function when the carriage is in position to align the extreme right-hand film program with the optical system. Also, if there should be any overtravel by motor 131, the bias on bar 117 and upon pin 129 or pin 130 returns the arm 125 to cause simultaneous engagement of said pins with the corresponding notches in the bar 117. Consequently, the carriage is accurately located in each position particularly when the indexing motor 131 is stopped.

Film advancing assembly

The film advancing assembly is moved to an inoperative position during the aforementioned movement or indexing of the carriage and is moved to an operative position after the selected film program is in juxtaposition with respect to the optical systems. Also, the film advancing assembly is operative to move only the film program in juxtaposition and includes a rotatable member constituting the sole driving connection to the film strip to be moved. According to the present invention, the rotatable member of the film advancing assembly serves both as the film moving member and the sound drum of the sound reproducing system.

According to the illustrated embodiment, the film advancing assembly comprises a support including an arm 136, and a bell crank 137 both mounted upon a shaft 138 which is journaled at one end in the bearing sleeve 48 of frame 46 and at the other end in the bearing sleeve 60 of the intermediate frame member 59, see Fig. 4. The bell crank 137 has an intermediate sleeve 139 fastened by pins 140 to shaft 138, has a horizontally extending arm 141, see Figs. 3 and 18, carrying at its outer end a platform 142 having a depending flange 143 and has an upwardly extending arm 144 carrying on its upper end, see Fig. 4, a sleeve 145 in which a ball bearing 146 is mounted by means of a retainer ring 147 and screws 148. The arm 136, see Figs. 4 and 8, has a sleeve 149 fastened to shaft 138 by pins 150, has an upright extension 151 in which a set screw 152 for carrying a lock nut 153 is threaded, and has a lateral extension 154 supporting a bushing 155 in coaxial alignment with the ball bearing 146 on the upper end of arm 144 of the bell crank 137. A shaft 156 is journaled in said ball bearing 146 and said bushing 155 and extends beyond the ball bearing 146, see Fig. 4, to receive a large diameter pulley 157 having a hub 158 and set screw 159 therein for attachment of pulley 157 to shaft 156. The other end of shaft 156 carries a drum 160 which is fastened to shaft 156 by a pin 161 and which has an internal annular recess 162 rendering said drum 160 partially hollow for a purpose to be explained. Preferably, the periphery of drum 160 is covered with a suitable material for frictional engagement with the surface of a film strip.

A driving means, such as a film driving motor 163, is mounted upon the platform 142 at the outer end of arm 141 of bell crank 137. Said film driving motor 163 has a pulley 164 encircled by an endless belt 165 which also encircles the previously mentioned large diameter pulley 157 on the end of shaft 156. Said pulley 157 is of large diameter and has considerable inertia so that it acts as a flywheel to render the rotation of the sound drum 160 uniform in a manner well understood by those skilled in the art of reproducing sound-on-film.

The film advancing assembly is arranged so as to be biased toward one position by gravity. For this purpose, the film drive motor 163 is displaced a relatively large distance from the pivotal axis or shaft 138 of the assembly and the shaft 156, large diameter pulley 157 thereon and arms 136 and 144 being substantially above the shaft 138 have a small effective displacement from the pivotal axis so that the center of gravity of the complete film advancing assembly is between shaft 138 and motor 163 and the normal tendency is for the film advancing assembly to swing about shaft 138 in a counter-clockwise direction as viewed from Figs. 3 and 8 and normally to move the drum 160 toward the carriage and film handling units thereon. As the film advancing assembly is moved toward its operative position, the periphery of drum 160 engages the film strip $F_1$ which is stretched in a straight line between rollers 92 and 93, see Fig. 8, by reason of the bias or spring action of roller 98. Continued movement of the film advancing assembly toward its operative position curves said film strip $F_1$, overcoming the action of spring operated roller 98 and moving a portion of the film strip $F_1$ between said rollers 92 and 93, into engagement with the reaction roller 103 and into the position shown in dotted lines in Fig. 8 and in full lines in Fig. 3. Thus, the frictional engagement between drum 160 and the film strip is gradually increased, first by the action of roller 98 and finally by the frictional engagement of the film strip between reaction roller 103 and the sound drum 160. In its final position, the frictional drive from the sound drum 160 to the film strip is sufficient to move the film strip without any appreciable slipping. The recess 110 in the side walls 69 and 70 of the film handling units are for the purpose of permitting entry of the shaft 156 of the film advancing means, see particularly Fig. 14. Also, said shaft 156 must have a length equal to or greater than the maximum carriage movement and so that the drum 160 may engage the most remote film strip or film program without interference between the large diameter pulley 157 and/or bell crank 137.

In the illustrated embodiment according to which laterally adjacent picture series or sound tracks are provided on the film strip, the drum 160 of the film advancing assembly enters each film handling unit in either of two positions depending on whether one or the other picture series and/or sound track is to be reproduced. For reasons which shall appear later, the sound track to be reproduced must overhang the end of drum 160 and consequently, when the sound track 113 on the center of the film is to be reproduced, somewhat more than one-half of the film strip F overhangs the end of drum 160, as shown in Fig. 14. Nevertheless, the frictional engagement between the film strip and the portion of the periphery of sound drum 160 is sufficient for movement of the film by the drum without appreciable slipping. In the other relative position of the film handling unit only the sound track 115 overhangs the end of drum 160 and obviously there is ample frictional engagement between the surface of the film strip and the periphery of the drum 160.

As the film advancing assembly is moved from its operative position and drum 160 is retracted from the film handling unit, the reaction roller 103 acts to hold the film strip against the periphery of drum 160 and the action of spring pressed roller 98, tending to stretch the film between rollers 92 and 93, causes the film strip to follow the drum 160 until such time as the film strip reaches a straight line path and the drum 160 is disengaged therefrom. Preferably, and according to the invention the drum 160 of the film advancing assembly is caused to rotate before its engagement with the film strip and continues to rotate until after its disengagement therefrom. The gradual increase and decrease of frictional engagement between the rotating drum 160 and the film strip $F_1$ produces a smooth and even starting and stopping of the film within the film handling units which is desirable from the standpoint of eliminating excessive strains and wear upon the film strip.

*Assembly moving means*

As previously mentioned, the film advancing assembly is moved from an inoperative position into an operative position wherein the film engaging and advancing drum 160 frictionally engages the juxtaposed film strip or film program. According to the invention and as already explained, the film moving assembly is moved into its operative position by means of gravity. Said film advancing assembly is moved from its operative position to its inoperative position by a film moving means which comprises an assembly moving motor 166 mounted upon the channel beam 37 adjacent the flange 143 of arm 141 of bell crank 137. A reducing gear within housing 167 drives a shaft 168 at a reduced ratio and a crank arm 169 is mounted at one end on said shaft 168 and carries upon its other end a roller 170. As shown particularly in Figs. 4 and 18, said roller 170 engages the lower edge of the flange 143 on the support of the film advancing assembly. When the crank arm 169 is in its lowermost position, see Figs. 3 and 4, the film advancing assembly is in operative position by virtue of gravity. The operative position of the film advancing assembly may be precisely adjusted by means of the set screw 152 on extension 151. When the assembly moving motor 166 is energized for operation and rotation of crank arm 169 the flange 143, bell crank 137 and the entire film advancing assembly is rotated in a clockwise direction as viewed from Figs. 3 and 18 and the film advancing assembly is moved to its inoperative position and drum 160 is moved out of engagement with the film strip in a film handling unit. The operation of motor 166 may be controlled in a manner to be explained hereinafter whereby the motor is deenergized when the crank arm 169 is moved to its upper position shown in Figs. 18 and 19 and in which the film engaging or sound drum 160 is in inoperative position or in the position shown in Figs. 8 and 18. The reduction gear being irreversible, the weight of the film advancing assembly on roller 170 and crank arm 169 will not move the motor 166 although deenergized. Obviously, the motor 166 may be a reversible motor operative to raise the crank arm 169 in one direction and to lower the crank arm 169 by movement in the opposite direction. Either arrangement of the assembly moving motor 166 will be understood by those skilled in the art.

The optical compensating means

Inasmuch as the film strips and film programs are continuously moved within each film handling unit, it is necessary to optically rectify the image projected from the moving film by means of an optical compensator. Such optical compensating means is provided in each of the film handling units and according to the illustrated embodiment is arranged to compensate for the movement of both series of picture images laterally arranged on the film strip.

The optical compensator is best shown in Fig. 13 and comprises an optical flat 171 mounted at each end in circular supports 172 having shaft extensions 173 journaled in ball bearings 174 mounted in rings 175 within the mounting member 72. A barrel type shutter comprises a cylinder 176 fitted into annular recess in circular supports 172 and provided with diametrically opposite apertures 177, see also Fig. 8. Said optical compensating member is arranged in the aperture 76 and enlarged portion 76' thereof of the mounting member 72 and the periphery of the barrel type shutter or cylinder 176 is just beneath the film engaging surfaces of the film guiding track 74 which has film tracks 74' arranged in a known manner to engage the margins and center of the film strip with offset portions therebetween. Such arrangement of the optical compensator within the mounting member 72 not only permits a small spacing between the film and optical flat 171 but definitely fixes their relative positions since both are in the same integral member. The optical compensator is operatively connected to the film strip in any suitable manner. The operative connection according to the invention has the advantages of simplicity and ruggedness and comprises a spur gear 178 mounted upon one of shaft extensions 173 and within an annular recess 179 in one of rings 175, see Fig. 13. The mounting member 72 is provided with a slot 180, see Figs. 9 and 12, and a pinion gear 181 is mounted by a bushing 182 and set screw 183 upon the shaft 81 carrying the sprockets. Said pinion gear 181 meshes with the spur gear 179 so that rotation of shaft 81 by movement of a perforated film in engagement with the sprocket teeth 84 or 88 thereon will cause rotation of the spur gear 178 and the optical flat 171 and shutter 176 of the optical compensator.

Such provision of an optical compensator in each and every film handling unit very simply and conveniently disposes of any problem of framing the images on the film strip F because once the film is threaded through the film handling unit and over sprocket 84 and through the film track 74 over aperture 76 the synchronism between the film and optical compensator will always frame the image properly. Furthermore, the short film path from the sprocket 84 to the aperture 76 eliminates any appreciable effect by shrinkage or stretching of the film after it is threaded in the unit. This arrangement of the optical compensator permits the rotating member or smooth film driving drum 160 to engage the film strip $F_1$ in any relative relation without affecting framing and this is a considerable advantage over any type of mechanical connection which must be disengaged for carriage movement or movement of another film into position and which inherently introduces lost motion and/or lack of synchronism between the driving member on the frame and the film perforations in the film strip of the film handling unit, either or both of which produce an out-of-frame condition.

The sound optical system

Basically, the sound reproducing means employed is well known. However, the present invention relates to useful and necessary arrangements of various elements of the optical system for sound reproduction. As usual, the sound optical system comprises a light source, lens for focusing a light beam upon the film sound track and a light-sensitive cell energized according to the characteristics of the sound track.

A lamphousing 184 is mounted by screws 185 upon the arm 136 of the film advancing assembly and encloses a bracket 186 supporting a socket 187 into which an incandescent lamp 188 is inserted. The frontwall of lamphousing 184 is provided with an opening 189. A lens tube 190 is mounted within clamps 191 fastened to arm 136 by screws 192. One end of the lens tube extends into lamphousing 184 adjacent the lamp 188 therein. The sound optical system within lens tube 190 may comprise any suitable condenser and objective assemblies such as a condensing lens 193 and an objective assembly 194. One type of sound optical system which has been found particularly suited for use in the sound reproducing system is disclosed and described in detail in McLeod and Altman U. S. Patent No. 2,146.905, issued February 14, 1939. Since the objective assembly of the sound optics should be very close to the sound track on the film, it is preferred to place the lens tube so that the objective assembly 194 is within the annular recess 162 of the drum 160 and accordingly the lens tube 190 is provided with a lateral recess 195 within which a portion of the drum 160 may rotate. While the portion of drum 160 extending into lens tube 190 cuts off some of the light from lamp 188 it has been found that the proximity of the objective assembly 194 to the sound track is more important and the light lost by cut off of the drum 160 does not materially affect the beam directed onto the sound track. The lens tube 190 and objective assembly 194 may be adjusted for proper focusing thereof on the sound track by loosening screws 192, moving lens tube 190 and then tightening screws 192 so that clamps 191 securely hold the lens tube 190 in adjusted position.

The light transmitted through the sound track is collected by an optical conductor having one end adjacent the sound track and the other end adjacent the light-sensitive cell. An internally reflecting bar 196 has a tapered end 197 adjacent the film when moved into its curved path by the drum 160 in operative position. Said bar 196 is mounted within the film handling unit by a holder 198 mounted on the side wall 69 of each film handling unit by screws 199. Said bar 196 is preferably made of Lucite but may be made of any other material capable of internally reflecting the light conducted thereby. The tapered end 197 of said bar 196 is wide enough to extend across both of the sound tracks 113 and 115 on the film strip and is angularly arranged so that the narrow face of tapered end 197 is substantially parallel to the film F₁. The other end of bar 196 is adjacent a photo-electric cell 44 which is mounted in a socket 201 upon the bracket 43, see Fig. 3. Thus, the light directed through either of the sound tracks 113 or 115 is efficiently collected and transmitted to the photo-electric cell 44 as each film handling unit is brought into position for reproduction therein. The remainder of the sound reproducing system comprises the amplifier 31 and loud speaker 30 which are connected to the photo-electric cell 44 in a known manner.

*Film operated control means*

The duration or termination of the film programs is determined by structural variations placed upon the film strip adjacent the conclusion of the film program thereon. Although such film operated means are broadly known, the film operated means according to the present invention has certain features and advantages not found in the prior art and particularly applicable to the provision of laterally adjacent film programs on the film strip.

The film operated projection control means is shown in Figs. 8, 15 and 16 and comprises a block 202 slidably mounted upon a pair of headed studs 203 which are mounted in arm 136 of the film advancing assembly support and a pair of coil springs 204 encircle studs 203 normally to press the supporting block 202 into engagement with said arm 136. A cam 205 extends from block 202 and is arranged to engage a film handling unit and/or to move into the film handling unit according to the relative position of the same and the film advancing assembly. A switch member is mounted upon said block 202 and comprises a stationary contact arm 206 carrying a contact 207 and a spring contact arm 208 also mounted upon block 202 and having a curved end 209 and carrying a contact 210.

The film operated means is mounted on arm 136 in any suitable position so that spring arm 208 may engage the edge of the film strip in the unit. Spring arm 208 normally assumes a position to open contacts 207 and 210. As the film advancing assembly is moved toward its operative position, the curved end 209 of spring control arm 208 engages the edge of the film and closes contacts 207 and 210 to maintain a holding circuit in a manner later to be described. Contacts 207 and 210 remain closed until a notch 116 in the unperforated margin of the film strip and adjacent the end of the film program arrives opposite spring control arm 208 and permits it to open in the manner shown in Fig. 16. The supporting block 202 is shown in Fig. 16 in the position for being operated by a film from which the picture series 114 and/or sound track 115 is being reproduced. When the carriage and film handling units are moved to position a picture series 112 and/or sonud tracks 113 for projection and/or reproduction, the relative position of the side wall 69 of the film handling unit and the arm 136 of the film advancing assembly toward the film handling unit the cam 205 engages the edge of side wall 69 and moves the block 202 and switch members thereon laterally and into the position shown in Fig. 15 whereupon the curved end 209 of the spring control arm 208 engages and is closed by the edge of a film strip F from which the picture series 112 and/or sound track 113 is to be reproduced. As before, the contacts 207 and 210 will be closed during movement of the film advancing assembly into operative position and will be opened by a structural variation or notch 116 on the film strip F adjacent the end of the program thereon.

Another film operated means is provided to protect the projector against operation when the film strip is not being moved through the film handling units either because of some film break or because of some failure in the film drive. Such a protective control means comprises, according to the invention, a member responsive only to longitudinal movement of the film and operative when there is no film movement to interrupt projection. The member responsive to film movement comprises a roller 211 connected through gears 212 to a rotating electrical means within a housing 213 mounted upon a bracket 214 on arm 136 of the film advancing assembly. Specifically, a small generator may be mounted within housing 213 to produce a control current effective to interrupt a projection operating or projection control circuit. Alternatively, a centrifugally operated switch may be placed within housing 213 and adapted when not rotated to interrupt such projection operating projection control circuit. While protective control means responsive to film movement or film breaks are generally known, the location of such control means on a movable film advancing assembly to co-operate with any of several film programs in the manner herein disclosed is novel.

The manner of connecting the film operated control means just described into the control circuits for the purpose mentioned will be explained hereinafter.

*The selector mechanism*

The selector control means is for the purpose of supervising the carriage operating means or carriage movement to position a selected film program in juxtaposition to the optical systems of the projector and/or sound reproducing means. Such a selector control means is responsive in the usual manner to the operation of the push buttons 32 located on the front of the cabinet and according to the invention the selector control means comprises a conductor member having a movement corresponding to carriage movement and for interrupting carriage movement when the carriage and film advancing assembly are in a predetermined relative position. Although the selector control means of the invention is illustrated and described as applied to a multi-program projector, such selector control means is also applicable to control relative movement of any pair of members having a plurality of predetermined positions and one of which is moved by an operating means.

In the illustrated embodiment the selector control means comprises a plurality of contacts 215 mounted upon an insulating strip 216 and each corresponding in position to one of the predetermined relative positions of the carriage and film advancing assembly. The insulating bar 216 is mounted between a pair of lateral supports 217 which have their ends mounted by bolts 217' upon the tops of end frames 46, see Fig. 4. The contacts 215 are each individually composed, as shown in Fig. 8, of a hollow shouldered stem 218 extending through strip 216 and held in place by a nut 219, a contact plunger 220, a spring 221 within the stem and bearing upon the head of plunger 220, and a screw cap 222 bearing upon the other end of spring 221 and for attaching a wire 223 to the contact. A pair of direction contacts 224, similar in construction to contacts 215, are mounted at each end of the insulating strip 216.

A conductor assembly comprises a rack bar 225 having its teeth meshing with a pinion gear 226 on the shaft 126 of the carriage operating means. A pair of side channels 227 are attached on each side of rack bar 225 and engage a plurality of rollers 228 mounted upon the lateral supports 217 by headed studs 229. An insulating layer 230 is placed upon the top of rack bar 225 and the upper flanges of side channels 227 and in turn supports a conductor bar which has conducting portions 231 and 232 and an intermediate insulating portion 233, see Fig. 5.

The gear connection between the conductor of the selector control means and the carriage operating means may have any suitable ratio but preferably is, as shown, a reduced ratio of the order of two-to-one. The principal requirement of such gear connection is that the conducting portions 231 and 232 and the insulating portion 233 have a movement directly corresponding to the movement of the carriage means and in the case of the present invention said portions have a simple harmonic motion like that of the carriage means. The conducting portions 231 and 232 need only have a total extent equal to the movement corresponding to the carriage movement. However, to permit the use of resiliently operated contact plungers 220 and to overcome the difficulty of making and breaking contact with said portions 231 and 232 and in order to supply a convenient direction control means said conducting portions 231 and 232 have a total length such that the contacts 215 and 224 are always in engagement with either conducting portion 231 or conducting portion 232. The direction control contacts 224 are spaced at a distance greater than the movement of the insulating portion 233 and so that one of said contacts 224 always and only engages the conducting portion 231 and the other of said contacts 224 always and only engages the conducting portion 232. The purpose of this arrangement of the direction control contacts 224 will be better understood in connection with the explanation of the direction control circuits.

*Electrical control and operating circuits*

Figure 20:
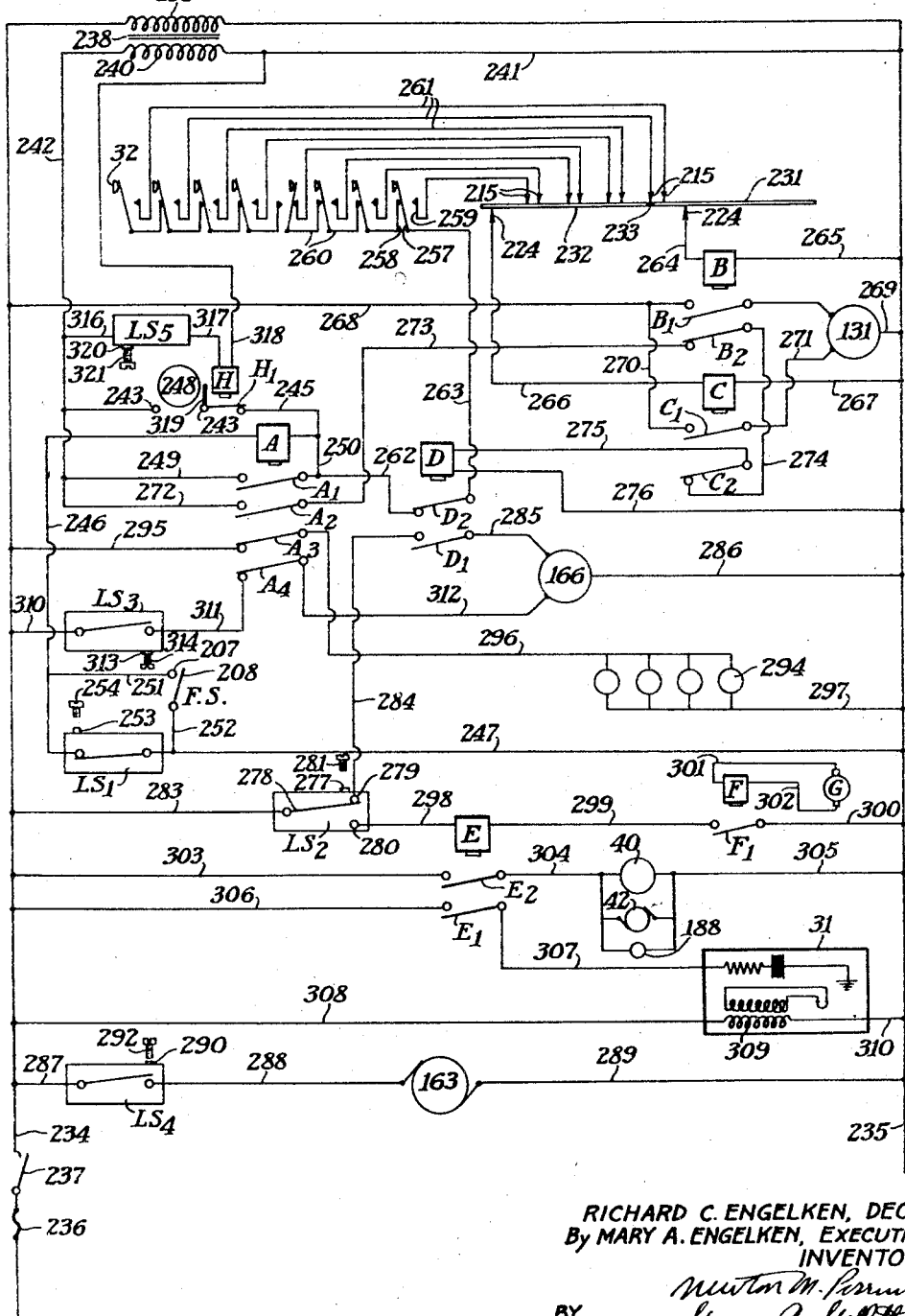
Fig. 20 is a wiring diagram showing the various control and operating circuits for the multi-program projector.

The motors, relays, switches, lamps, amplifiers, coin-controlled mechanism, selector switches, etc. embodied in the control and operating circuits now to be explained and diagrammatically illustrated in Fig. 20, are of standard form and are commercially available. The present invention relates primarily to the arrangements and corelation of such elements to produce the control and operating functions necessary and desirable to the optimum performance of a multi-program projector.

All of the operating circuits to be mentioned hereinafter are connected directly across a standard source of electrical energy and represented by mains 234 and 235, either or both of which are fed through a fuse 236 and main switch 237. Most of the control circuits are connected across the secondary of a transformer 238 which has a primary winding 239 across supply mains 234 and 235 and which has a secondary winding 240 connected at one end by a wire 241 to main 235 and connected at the other end by a secondary supply main 242 to the control circuits to be enumerated.

The coin-controlled mechanism comprises the slot 33 in the front of the cabinet and a pair of contacts 243 arranged to be closed upon passage of a coin through said coin slot 33. One of contacts 243 is connected to wire 242 and the other of contacts 243 is connected through a switch member $H_1$ and wire 245 to one side of a relay coil A which is adapted when energized to operate switch arms $A_1$, $A_2$, $A_3$, and $A_4$, switch arms $A_1$ and $A_2$ being normally open and closed by energization of coil A, while switch arms $A_3$ and $A_4$ are normally closed and are opened by energization of relay coil A. The other side of relay coil A is connected by a wire 246 to a normally closed limit switch $LS_1$ and by a wire 247 to the supply main 235. As a result, insertion of a coin 248 to close contacts 243 completes the circuit through relay coil A to energize the same, to close switches $A_1$ and $A_2$ and to open switches $A_3$ and $A_4$.

A holding circuit for the relay A is established by the closing of switch $A_1$ and extends from the secondary main 242 through a wire 249, through switch $A_1$, through a wire 250, through relay coil A, through wire 246, through limit switch $LS_1$ and wire 247 to the supply main 235. The limit switch $LS_1$ may be shunted by an auxiliary circuit including a film operated switch FS including a fixed contact 207 and spring control arm 208 shown in Figs. 15 and 16 and said shunt circuit includes a wire 251 connected between wire 245 and contact 207 and a wire 252 connected between switch arm 208 and wire 247. The limit switch $LS_1$ has a plunger 253 adapted to be operated by a stud 254 and which is mounted in a bracket 255 on the flange 143 of the film advancing assembly. For convenience, it may be necessary to mount a leaf spring 256 upon limit switch $LS_1$ in contact with said plunger 253. Said stud 254 is so adjusted and said limit switch $LS_1$ is so located upon the projector frame that the normally closed switch $LS_1$ is opened shortly before the film advancing assembly is moved into the operative position of the film advancing assembly and drum 160 shown in Figs. 3 and 14. The film switch FS and its arms 206 and 208 are so mounted and located upon the arm 136 of the film advancing assembly that the contacts 207 and 210 are closed by engagement of the spring control arm 208 with the edge of a film program somewhat before the limit switch LS₁ is open. This closing of the film switch FS before opening of the limit switch LS₁ during inward movement of the film advancing assembly is indicated by the diagram entitled "Holding circuit" of Fig. 21. Under normal operating conditions the holding circuit will be maintained until the film switch FS is opened by the structural variation on the film strip or until a notch 116 in the margin of the film strip permits spring control arm 208 to move its contact away from the stationary contact 210. However, if for any reason there should be no film in position for engagement by the spring control arm 208 of film switch FS the film switch would remain open and upon opening of limit switch LS₁ the holding circuit is interrupted and the inward movement of the film advancing assembly will be stopped and reversed in a manner to be explained. For obvious reasons the film strip F, after opening of the film switch FS, continues to move until the notch 116 passes its point of engagement with the spring control arm 208 and the film switch FS is closed again, having been opened only for a short interval. Nevertheless, the interruption of the holding circuit has de-energized relay coil A and permitted switch A₁ to open so that reclosing of film switch FS after passage of the notch 116 does not re-establish the holding circuit. Subsequently, the limit switch LS₁ is closed during outward movement of the film advancing assembly and shortly thereafter the film switch FS is opened by disengagement of the spring control arm 208 from the edge of the juxtaposed film strip. These sequences of operations of film switch FS and limit switch LS₁ are indicated in the right hand portion of the diagram entitled "Holding circuit" in Fig. 21.

The selector control means includes the selector contacts 215, the direction control contacts 224, the conducting portions 231 and 232 and the insulating portion 233 already described and also a selector control circuit now to be explained. The selector switches are of known design and there is a selector switch corresponding to each predetermined relative position of the two movable members or for each film program on the carriage. Such selector switches each comprise a switch arm 257 operated by the corresponding push button 32 available at the front of the cabinet and normally engaging a back contact 258 but moved by operation of push button 32 into engagement with a front contact 259, see Fig. 20. Each back contact 258 is connected by a wire 260 to the switch arm 257 of the adjacent selector switch and each front contact 259 is connected by a wire 261 to the corresponding selector contact 215. The selector switches and push buttons are of a conventional design in which the push button and corresponding selector switch remain in operative position until another push button is operated or until an "all release" button is operated to clear all of the push buttons 32 and return all of the selector switches to their normal position. Also, the selector switches are connected in series through switch arms 257 and back contacts 258 until one of switch arms 257 is operated by the corresponding push button 32 and such operated switch arm 257 is connected by a corresponding wire 261 to a corresponding selector contact 215 and such operation of a switch arm 257 interrupts the series circuit through the remaining selector switches.

The selector control circuit extends from secondary main 242 through wire 249, through switch A₁ which is closed by insertion of a coin, through a wire 262, through a relay switch D₂, through a wire 263, through switch arms 257, back contacts 258 and wires 260 of the selector switches, through one of wires 261 and one of selector contacts 215 and then through either of a pair of direction control circuits. One of said direction control circuits comprises a wire 264 connected to one of the direction control contacts 224, a relay coil B and a wire 265 connected to the supply main 235. The other direction control circuit includes a wire 266 connected to the other direction control contact 224 to a relay coil C and a wire 267 to the supply main 235. Assuming that the conductor bar of the selector control means is in the position illustrated in Fig. 20 or that the number 7 film program, counted from the left of the film carriage, had just been reproduced and that push button 32 corresponding to the number 4 film program has been manually operated, then the selector control circuit extends as previously traced to the fourth selector contact 215 through conducting portion 232 of the selector conductor bar and through the direction control circuit including wire 266, relay coil C and wire 267. The other direction control circuit is not energized because the insulating portion 233 is between the energized contact and the right-hand direction control contact 224. However, if the selector contact 215 corresponding to the number 8 program had been energized then the selector control circuit would extend through the direction control circuit comprising wire 264, relay coil B and wire 265. The relays including coils B and C are direct acting relays and each includes a normally open and a normally closed switch, moved to opposite positions by energization of the coils B or C.

A selector operating circuit is responsive to energization of the selector control circuit and includes the indexing motor 131 of the permanent magnet pole type and which is operated in opposite directions for corresponding movement or indexing of the carriage. Such selector operating circuit comprises a common wire 268 extending from supply main 234 through a switch B₁ to one side of indexing motor 131 which has its other side connected by a common wire 269 to the supply main 235. Energization of the indexing motor 131 through said switch B₁ operates the same to move indexing arm 125 in a clockwise direction and thereby moving the carriage, the film handling units, the conducting portions 231 and 232 and insulating portion 233 to the right as viewed in Figs. 3, 5, and 20. The selector operating circuit also includes a branch circuit comprising a wire 270, switch C₁ and a wire 271 connected to indexing motor 131 to cause its operation for counter-clockwise rotation of the indexing arm 125 and movement of the carriage and conductor bars to the left as viewed from Figs. 4, 5 and 20. By reason of the insulating portion 233 relay coil B and relay coil C can not be energized simultaneously so that switches B₁ and C₁ can not be closed at the same time. Consequently, energization of conducting portion 231 or 232 by the operation of a selector switch connected to a selector contact 215 in engagement with either of said portions determines the branch of the selector operating circuit to be energized and will always cause rotation of the indexing motor 131 in such a direction as to move the insulating portion 233 of the selector bar toward the selector contact 215 connected to a manually operated selector switch. Referring to the diagram of Fig. 21 entitled "Selector operating circuit" it will be noted that the selector operating circuit is closed through switch $B_1$ or $C_1$ upon selection of a film program and upon the insertion of a coin and energization of relay coil A and will be interrupted by the engagement of insulating portion 233 with the selector contact 215 corresponding to the selected film program as soon as that program is moved into juxtaposition with respect to the optical system of the projector.

Figure 21:
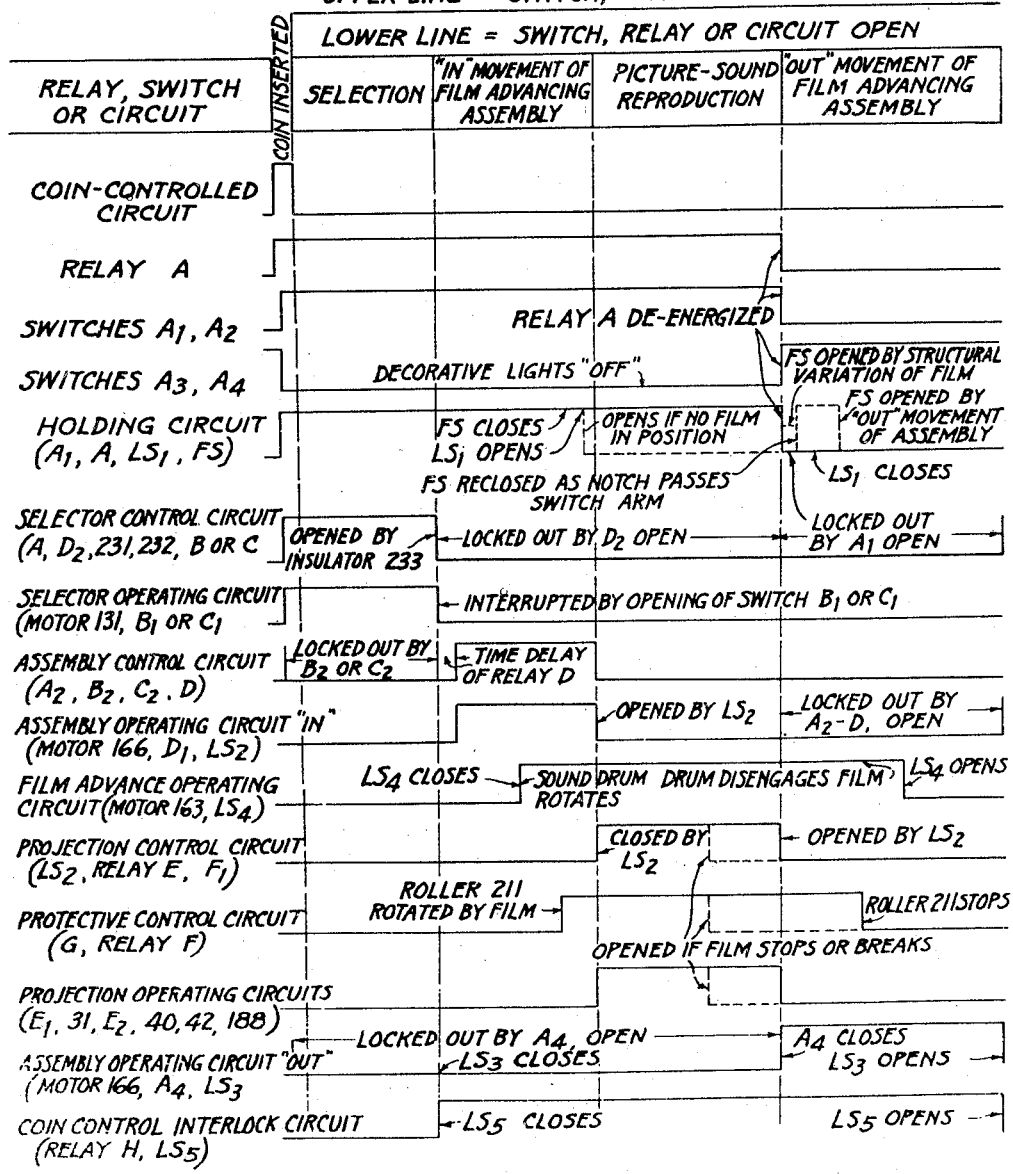
Fig. 21 is an operating diagram showing the relative movement, energization and/or operation of the various elements and circuits to produce the automatic operation contemplated by the invention.

An assembly control circuit is provided to supervise the operation of the assembly moving motor 166 for inward and outward movement of the film advancing assembly. Said assembly control circuit is also arranged according to the invention so that the aforementioned selector control circuit has preference thereover and so that the selector control and assembly control circuits can not be simultaneously completed. The assembly control circuit extends from secondary main 242 through a wire 272, through switch $A_2$, through a wire 273, through switch $B_2$, through a wire 274, through switch $C_2$, through wire 275, through relay coil D and through a wire 276 to the supply main 235. The relay including the coil D is of a well known time delayed action type and comprises a normally opened switch $D_1$ and normally closed switch $D_2$, which switches are not operated from their normal positions until an interval, approximately one-half second, following energization of the relay coil D. Thus, when relay coil A is energized, switches $A_1$ and $A_2$ are closed at the same time but the delayed action interval insures that relay coil B or relay coil C is energized to open either switch $B_2$ or switch $C_2$ before relay coil D has been energized to open the switch $D_2$ in the selector control circuit. During the selection cycle the assembly control circuit is locked out by the opening of either switch $B_2$ or switch $C_2$. At the completion of the selection cycle switches $B_2$ and $C_2$ are both closed and relay coil D is energized so that after the aforementioned delayed action interval switch $D_2$ is opened to interrupt the selector control circuit and the switch $D_1$ is closed for a purpose next to be described. Said assembly control circuit is only operative during the "in" movement of the film advancing assembly because said assembly control circuit is interrupted by opening of the switch $A_2$ upon deenergization of coil A after completion of the film program. The details of the function of the assembly control circuit are also illustrated in the diagram of Fig. 21.

Figures 18, 19:
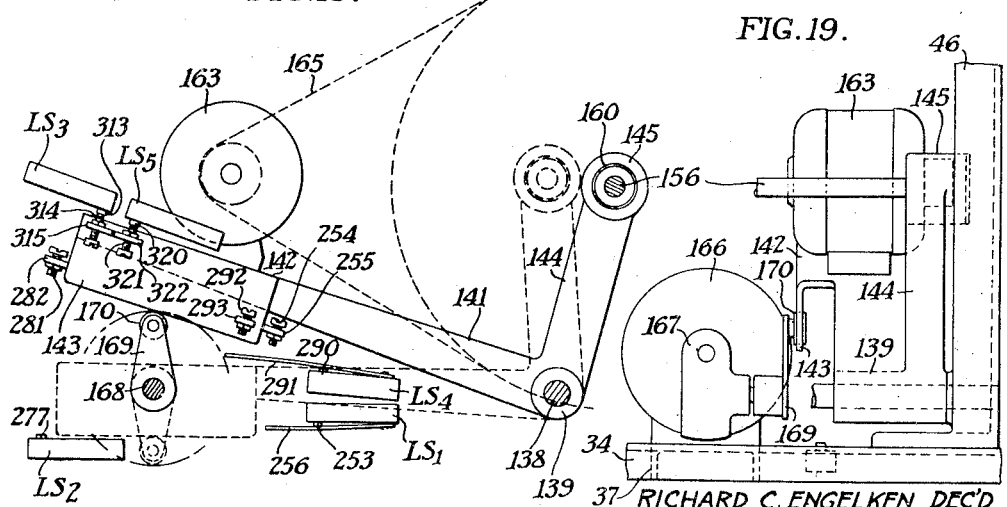
Fig. 18 is a fragmentary side elevation of a portion of the film advancing assembly.
Fig. 19 is an end elevation of the film advancing assembly and the assembly moving means.

Two assembly operating circuits are provided, one for energizing the assembly moving motor 166 to permit movement of the film advancing assembly and drum 160 toward and into operative position and the other for energizing the assembly moving motor 166 to move the film advancing assembly and drum 160 from operative position toward and into the extreme inoperative position shown in Figs. 8 and 16. The first mentioned assembly operating circuit includes a limit switch $LS_2$ which is operated to interrupt said circuit upon movement of the film advancing assembly to its final operative position or the position shown in Figs. 3 and 14. Preferably, said limit switch $LS_2$ also completes a projection control circuit simultaneously with the opening of the assembly operating circuit "in." Consequently, limit switch $LS_2$ is preferably a single pole double throw switch including a plunger 277 and a switch arm 278 normally engaging the contact 279 but movable into engagement with a contact 280. Said limit switch $LS_2$, see Figs. 4 and 18, is mounted on the frame in a position so that an adjustable stud 281 mounted in a bracket 282 on flange 143 of the film advancing assembly support engages said plunger 277 to move the switch arm 278 from engagement with contact 279 and into engagement with contact 280 just as the film advancing assembly and drum 160 thereof are moved into the final operative position. The assembly operating circuit comprises a wire 283 connected to switch arm 278 of limit switch $LS_2$ and extends through contact 279, through a wire 284, through switch $D_1$, through a wire 285, through assembly moving motor 166 and through a wire 286 to the other supply main 235. Completion of said assembly operating circuit energizes the motor 166 for rotation so as to move the crank arm 169 from the position shown in Figs. 18 and 19 to the position shown in Figs. 3 and 4. As previously mentioned, the center of gravity of the film advancing assembly is such that the flange 143 thereof follows the roller 170 on crank arm 169 and as a result the operation of motor 166 permits movement of the drum 160 into its final operative position. Just as the film advancing assembly and drum 160 are moved to said final operative position, the stud 281 engages plunger 277 to move switch arm 278 out of engagement with contact 279 to open said assembly operating circuit "in" and to deenergize the assembly moving motor 166. As shown in the diagram of Fig. 21 entitled "Assembly operating circuit 'in'" the contact 279 and switch arm 278 of limit switch $LS_2$ remain open during the picture and sound reproduction at the conclusion of which relay A is deenergized to open the assembly control circuit and in turn de-energizing coil D to open switch $D_1$ so that the assembly operating circuit "in" can not again be completed until switch $D_1$ is closed by re-energization of the relay coil A and closing of the switch $A_2$.

As also previously mentioned, the film engaging drum 160 is rotating during the "in" and "out" movement of the film advancing assembly and during picture projection and sound reproduction. The film drive motor 163 as already explained drives the drum 160. The energization and deenergization of said film drive motor 163 is determined by a film advance operating circuit including a wire 287 connected between supply main 234 and one side of a normally open limit switch $LS_4$, includes a wire 288 connected between the other side of limit switch $LS_4$ and film drive motor 163 and a wire 289 connected between the other side of film drive motor 163 and supply main 235. Said switch $LS_4$ has a plunger 290 and may have a leaf spring 291 extending thereover and into the path of a stud 292 mounted upon a bracket 293 on the flange 143 of the film advancing assembly support. Said switch $LS_4$ is mounted upon the frame of the projector and is relatively arranged with respect to stud 292 so as to be closed by engagement of the stud 292 with leaf spring 291 during the inward movement of the film advancing assembly and before the drum 160 engages the film strip $F_1$ between the rollers 92 and 93 of the film handling unit. Conversely, this arrangement of a switch $LS_4$ and stud 292 opens the circuit to film drive motor 163 after the drum 160 has been moved out of engagement with the film strip $F_1$. This rotation of the drum 160 before, during and after its engagement with the film strip insures the aforementioned smooth and even starting and stopping of film movement. The relative energization of said film advancing operating circuit is illustrated in Fig. 21.

Decorative lights 294 are disposed at suitable locations on or within the cabinet so as to illuminate the same and/or the screen 25 thereof to make the projector attractive while inoperative. The decorative lighting circuit extends from the supply main 234 through a wire 295, through switch $A_3$, through a wire 296, through said decorative lights 294, and through a wire 297 to the other supply main 235. Since switch $A_3$ is normally closed the decorative lights will be on when the projector is not operating and the lighting circuit will be interrupted to extinguish said lights 294 upon the insertion of a coin 248 and energization of the relay coil A.

A projection control circuit is preferably arranged so that the projection lamp 40, blower motor 42 and exciter lamp 188 are energized only during the projection and sound reproduction portion of the operating cycle of the projector. This is accomplished by a projection cycle circuit preferably energized alternatively with opening of the assembly control circuit "in" and including a wire 298 connected to contact 280 of limit switch $LS_2$, a relay coil E, a wire 299, a normally open switch $F_1$ and a wire 300 connected to the supply main 235. Said projection control circuit is preferably provided with a protective control means responsive only to movement of the selected or juxtaposed film strip and for maintaining the projection control circuit only when a selected film strip is in position and is moving. In the illustrated embodiment such protective control means comprises a small generator G to be mounted within the housing 213 on arm 136 of the film advancing assembly support. Said generator G is connected by wires 301 and 302 to a relay coil F which when energized holds the normally open switch $F_1$ in closed position. Alternatively, and within the scope of the invention any other means responsive only to film movement may be provided to maintain the projection control circuit closed and such means may be centrifugally operated means responsive only to film movement and including or operatively connected to switch $F_1$ which will be closed to maintain the projection control circuit only during the presence of a moving film in the film handling unit. As shown in the diagram of Fig. 21 entitled "Projection control circuit" the closing of switch arm 278 and contact 280 completes the same and may be interrupted during the picture-sound reproduction portion of the operating cycle if the film strip stops or breaks. Finally, the projection control circuit is open when the film advancing assembly is moved out of its final operative position and when the switch arm 278 of limit switch $LS_2$ moves out of engagement with contact 280. The relative energization of the protective control circuit is also shown in Fig. 21 and said protective control circuit is prepared or completed before completion of the projection control circuit by engagement of the roller 211 with the film strip prior to commencement of the picture-sound reproduction and roller 211 continues to rotate under normal conditions to maintain switch $F_1$ closed until after the projection control circuit has been opened by disengagement of switch arm 278 and contact 280 and switch $LS_2$.

One or more projection operating circuits are provided and are completed by normally opened switches, such as switch $E_1$ and $E_2$, which are closed by energization of the relay coil E in the projection control circuit. One such projection operating circuit includes a wire 303 connected to supply main 234, switch $E_2$, wire 304, projection lamp 40, blower motor 42 and/or exciter lamp 188 connected in parallel and a wire 305 connected to the other supply main 235. Another projection operating circuit includes a wire 306 connected to supply main 234, switch $E_1$, a wire 307 and the rectifier circuits of the amplifier 31. In normal operation a filament circuit is connected directly across the supply mains 234 and 235 and comprises a wire 308, a filament transformer 309 and a wire 310. The secondary of filament transformer 309 is thus connected to the filaments of the various tubes within the amplifier 31 when the main switch 237 is closed. Said projection operating circuits are completed immediately upon the closing of switches $E_1$ and $E_2$ by energization of the relay coil E and are normally interrupted by opening of switch arm 278 and contact 280. However, if no film is present in the juxtaposed film handling unit or if a juxtaposed film strip breaks or stops said projection operating circuits are interrupted by reason of the failure of the film switch FS to close or by the opening thereof, see the diagram entitled "Projection operating circuits" of Fig. 21.

As soon as the film program is completed under normal operating conditions or if picture projection or sound reproduction are interrupted by breaking or stopping of the juxtaposed film strip, the film advancing assembly is moved out of its operative position and into an inoperative position. Such movement of the film advancing assembly is preferably accomplished by the assembly moving motor 166 which may rotate in the same direction or in opposite directions to move the crank arm 169 from the position shown in Figs. 3 and 4 to that shown in Figs. 18 and 19. The outward movement of the film advancing assembly is accomplished by an assembly operating circuit "out" which comprises a wire 310 connected to supply main 234, a limit switch $LS_3$, a wire 311, switch $A_4$ and a wire 312 connected to motor 166 for energizing the same in either direction to move said crank arm 169 and said film advancing assembly from operative to inoperative position. Said switch $LS_3$ is normally closed and has a plunger 313 operated to open it. A stud 314 is mounted on a bracket 315 on flange 143 of the film advancing assembly in such position so as to engage said plunger 313 and open switch $LS_3$ just as the film advancing assembly and flange 143 reach their extreme positions corresponding to the final inoperative position of the film advancing assembly. The assembly operating circuit "out" is interrupted during selection of the film program, during the inward movement of the film advancing assembly and during picture-sound reproduction because the switch $A_4$ is maintained open by energization of the relay coil A, although said switch $LS_3$ is closed immediately after the film advancing assembly leaves its extreme inoperative position. Nor can said assembly operating circuit "out" be energized in opposition to the assembly operating circuit "in" because said switch $LS_3$ is held open until after selection and until after the film advancing assembly has been moved toward its operative position.

Since certain of the film operated members provided according to the invention extend between the walls 69 and 70 of the juxtaposed film handling unit, some damage might be caused by insertion of a second coin 248 during outward movement of the film advancing assembly and particularly for a selection requiring carriage movement. This difficulty might be obviated by recessing the walls of the film handling units but is preferably overcome by the provision of an interlocking circuit energized immediately upon movement of the film advancing assembly away from its extreme inoperative position and interrupted only by return of the film advancing assembly to its extreme inoperative position. Such an interlocking means comprises a wire 316 connected to supply main 242, a normally closed limit switch LS₅, a wire 317, a relay coil H and a wire 318 connected to the wire 241 on the other side of the secondary winding of transformer 238. The switch member H₁ which is normally closed and opened by energization of relay coil H may have a projection 319 adapted when switch H₁ is opened to block the passage of a coin through the coin slot and into engagement with contacts 243. Said switch LS₅ has a plunger 320 and is located on the frame so as to be engaged by a stud 321 in a bracket 322 on flange 143 of the film advancing assembly support. In other words, switch LS₅ is normally closed but is held open by stud 321 while the film advancing assembly is in its outermost or inoperative position. As soon as the film advancing assembly moves inwardly, switch LS₅ closes to energize relay coil H, to open switch H₁ and interrupt the coin-controlled circuit to relay A and, if desired, to prevent passage of another coin through the coin slot and into engagement with contacts 243 until the film advancing assembly has been returned to its outermost inoperative position whereupon switch LS₅ is again opened and switch H₁ is closed.

In the illustrated embodiment the physical location of the switches LS₁, LS₂, LS₃, LS₄, and LS₅ is illustrated in Fig. 18 but arrangement of the limit switches to obtain their required operation at the time indicated may be accomplished in other ways. Likewise, some of the circuits, relays and switches disclosed may be replaced by equivalent means. However, such alterations or variations are within the scope of the invention as long as the operation or sequence resulting is within the scope of the claims.

*Complete operating cycle*

Although the foregoing description of the multi-program projector of the invention has clearly stated the function and operation of each means, element, circuit, etc., a brief description of a complete cycle will now be given. Assuming only that the main switch 237 is closed and that the film advancing assembly is in an inoperative position, the mechanical parts of the projector and electrical control and operating devices will be in the positions shown in Figs. 8, 18 and 20. The operator or customer desiring a certain selection manually operates one of the push buttons 32 to close one of the selector switch arms 257, and inserts a coin into coin slot 33 and which coin 248 closes the contacts 243. The coin-controlled circuit is thus completed to relay coil A and the closing of switch A under normal conditions completes the holding circuit to maintain relay coil A in energized condition. Unless the selection was a "repeat," the selector control circuit will be completed through one of the selector contacts 215 and one of the conductor portions 231 or 232 and one of the relay coils B or C. The delayed action of coil D gives completion of the selector control circuit preference over completion of the assembly control circuit which is locked out by opening of either of switches B₂ or C₂. Energization of either relay coil B or C closes either switch B₁ or C₁ to energize the indexing motor 131 and to cause rotation of shaft 126 and arm 125 so that pins 129 and 130 alternately engage the notches 124 in bar 117 to move the carriage and film handling units thereon with respect to the optical system of the projector. At the same time the pinion gear 226 on shaft 126 is rotated and moves rack bar 225 to move the conducting portions 231 and 232 with respect to the selector contacts 215. The direction control contacts 224 have caused energization of the indexing motor 131 in a direction such as to move the insulating portion 233 toward the selector contact 215 corresponding to the film program selected. When the insulating portion 233 engages the corresponding selector contact 215 the selector control circuit is broken, motor 131 is de-energized and the indexing arm 125 comes to rest. The bias or spring action of springs 121 on bar 117 moves it downwardly and may cause rotation of said arm 125 until both pins 129 and 130 simultaneously engage adjacent notches 124. As a result, even if the indexing motor 131 has not stopped with the carriage in a precisely accurate position, the bias upon bar 117 and its cooperation with pins 129 and 130 will accurately index the film program with respect to the optical assembly. The carriage means is moved by the arm 125 and pin 129 or pin 130 with simple harmonic motion and the pins 129 and 130 engage and disengage the notches 124 at the least critical part of such motion and the carriage movement by either pin 129 or by pin 130 has maximum velocity at the intermediate portion of the stroke, the carriage being gradually accelerated and decelerated by said pins 129 and 130 to eliminate any difficulties from carriage inertia. Also, the deceleration to zero movement of the carriage as each film program is aligned with the optical system provides ample opportunity for relay operation when the selector contact 215 corresponding to the selected film program engages the insulating portion 233. Upon completion of the selection portion of the cycle, relays B and C are de-energized, switches B₁ and C₁ are opened to de-energize indexing motor 131 and switches B₂ and C₂ are both closed to complete the assembly control circuit.

The time delayed action of relay coil D, which gave preference to completion of the selection control circuit over completion of the assembly control circuit now after its time delay interval closes switch D₁ of the assembly operating circuit and opens switch D₂ in the selector control circuit to lock out that circuit and prevent any indexing of the carriage during inward movement of the film advancing assembly. Closing of switch D₁ completes the assembly operating circuit "in" through switch LS₂ and assembly moving motor 166 is energized to rotate crank arm 169 and permit the gravitational action of the film advancing assembly to move the film advancing assembly out of its extreme inoperative position and toward its operative position. Immediately after such movement of the film advancing assembly has taken place switches LS₃ and LS₅ are closed. However, the assembly circuit "out" is opened by switch A₄ so that motor 166 can not be energized by the closing of switch LS₃. At the same time, however, closing of switch LS1 energizes relay coil H and opens switch H₁ to prevent re-energization of the relay coil A and also to prevent another coin 248 from closing the contacts 243. During the movement of the film advancing assembly toward its operative position the switch LS₄ is closed to energize the film drive motor 163 and to cause the belt 165, flywheel pulley 157, shaft 156 and the hollow sound drum 160 to be rotated. Soon thereafter the drum 160 engages the film strip F₁ and curves the same between the rollers 92 and 93 of the film handling unit. At approximately the same time the spring control arm 208 of the film operated switch FS engages the edge of the film strip F₁ and is closed thereby. At about the same time the roller 211 of the film operated protective means is rotated by the film to close switch F₁ and prepare the projection control circuit for completion. Next, the switch LS₁ is opened by the stud 254 on the film advancing assembly engaging the plunger 253 but if conditions are otherwise normal switch FS has already closed and the holding circuit for the relay coil A is maintained. Otherwise, if the switch FS has not closed because of an abnormal condition, the holding circuit to relay coil A will be interrupted, switch A₄ will be closed and the assembly operating circuit "out" will be completed and the film advancing assembly will be returned to its inoperative position. If the projector has two picture series and/or sound tracks on a film strip and the carriage has been moved to place one of said series in alignment with the optical system, the supporting block 202 for the film switch FS may be moved by the action of cam 205 upon the side walls 69 of the film handling unit. Under normal conditions the film advancing assembly will be moved inwardly and the film strip F₁ will be moved against the reaction roller 103 by the rotating drum 160 and biased roller 98 will be moved against the action of spring 101 on arm 99. The gradual increase of frictional engagement between the drum 160 and the film strip will prevent the creation of excessive strain in starting the movement of the film strip. When the film advancing assembly has moved to its innermost operative position, plunger 281 on the film advancing carriage moves the switch arm 278 out of engagement with contact 279 to de-energize assembly moving motor 166 and stop any further movement of said assembly.

At the same time the switch arm 278 of switch LS₂ is moved into contact with switch contact 280 and the relay coil E is energized to complete the various projection operating circuits, to turn on the projection lamp 40, blower 42 and exciter lamp 188 and to connect the rectifiers of the amplifier 31 for sound reproduction. The film strip F is already moving, the optical compensator or optical flat 171 is rotating and the picture images on the film are projected through aperture 76, objective assembly 53 and the images reflected by the mirrors 26, 27 and 28 onto the screen 25 in the front wall of the cabinet. Simultaneously, the exciter lamp 188 directs a light beam through the lens tube 190 and the objective assembly 194 therein, through the sound track on the film and through the optical bar 196 onto the photo-electric cell 44. The variations in light intensity caused by the sound track and falling upon the light-sensitive cell vary the signal transmitted to the amplifier 31 and reproduced by the loud speaker 30. By these means a sound motion picture is reproduced for the customer or audience of a film program which has been selected.

If for any reason the film should break or stop during the projection cycle the roller 211 would stop and cause opening of the projection control circuit to de-energize coil E and interrupt the projection operating circuits to the lamps 40 and 188 and the sound operating reproducing circuit to the amplifier 31. This would prevent any burning or blistering of a film strip that might be in the gate of the film handling unit. Such protective control means would also prevent the turning on of the lamps 40 and 188 if the film strip was not properly moving within the film handling unit. The film break would not, however, render the projector inoperative to show any programs because the film switch FS would be opened by such film break, relay coil A would be de-energized and the assembly operating circuit "out" would be completed by switch A₄ to return the film advancing assembly to its inoperative position and to recondition the control and operating circuits for selection and performance of another program.

Under normal conditions the arrival of a notch 116 in the margin of the film opens the film switch FS to de-energize relay coil A and in the manner just explained to return the film advancing assembly to its inoperative position. The film switch FS is only momentarily opened because the notch 116 is moved therebeyond. However, the momentary opening of switch FS is sufficient to de-energize relay coil A and interrupt the picture-sound reproduction portion of the cycle. Reclosing of switch FS by passage of the notch does not re-establish the holding circuit for relay coil A because the holding switch arm A₁ has been opened.

Upon closing of switch A₄ after de-energization of relay coil A and since switch LS₃ was closed, as soon as the film assembly left its extreme inoperative position, the assembly operating circuit "out" is now completed for energization of assembly moving motor 166 and movement of the crank arm 169 to raise flange 143 of the film advancing assembly support and move the drum 160 away from the film program and film handling unit. As the drum 160 is moved out of the film handling unit the spring bias on roller 98 tends to move the film on film strip F₁ so that the film strip follows or remains in contact with the drum until its straight line position between the rollers 92 and 93 is attained. Commencement of such outward movement of the film advancing assembly causes switch arm 278 of switch LS₂ to move into engagement with contact 279 to reestablish the assembly operating circuit "in" but such circuit is now open because switch D₁ is open by reason of switch A₂ being opened by de-energization of relay coil A. During such outward movement of the film advancing assembly the selector control circuit is locked out by the opening of switch A₁. The disengagement of the spring control arm 208 of film switch FS, disengagement of the drum 160 from the film and disengagement and stopping of roller 211 all occur in reverse order to that in which they took place. Later, switch LS₄ is opened to de-energize the film driving motor 163. Finally, as the film advancing assembly reaches its outermost inoperative position switch LS₃ is opened to interrupt the assembly operating circuit "out" and switch LS₅ is opened to de-energize the coin-controlled interlocking circuit and permit passage of another coin through the coin slot to re-initiate the complete cycle just described.

Since other modifications and variations of the means, elements, circuits and other devices shown herein are possible, the present disclosure is to be construed in an illustrative sense and the scope of the invention is to be determined by the claims which follow.

Having now particularly described the invention what it is desired to secure by Letters Patent of the United States and what is claimed is:

1. In an automatic selector apparatus, the combination with a pair of members relatively movable to a plurality of predetermined positions, and an operating means connected to one of said members and for moving the same to any of said relative predetermined positions, of a selector means controlling said operating means and comprising a plurality of contacts each corresponding to a relative predetermined position of said member, and a conductor element having an insulated portion and for engaging said contacts, and an operative connection between said selector means and the movable one of said members and for relatively moving said conductor element and said insulated portion with respect to said contact.

2. In an automatic selector apparatus, the combination with a pair of members relatively movable to a plurality of predetermined positions, and an operating means connected to one of said members and for moving the same to any of said relative predetermined positions, of a selector means controlling said operating means and comprising a plurality of contacts each corresponding to a relative predetermined position of said members, and a conductor element engaging all but one of said contacts and having an insulated portion engaging said one contact, and an operative connection between the movable one of said members and said selector means and for relatively moving said conductor element and said contact to bring said insulated portion into engagement with another of said contacts.

3. In an automatic selector apparatus, the combination with a pair of members relatively movable to a plurality of predetermined positions, and a simple harmonic operating means connected to one of said members for imparting simple harmonic motion thereto and timed to have rest periods corresponding to said predetermined positions, of a selector means controlling said operating means and comprising a pair of relatively movable selector parts having a plurality of relative operative positions each corresponding to a relative predetermined position of said members, one of said selector parts being operatively connected to said one member for simple harmonic motion of said selector part and so that the rest periods thereof correspond to said relative operative position of said selector part.

4. In an automatic selector apparatus, the combination with a pair of members relatively movable to a plurality of predetermined positions, and a simple harmonic operating means connected to one of said members and for imparting simple harmonic motion thereto and timed to have rest periods corresponding to said predetermined position, of a selector means comprising a conductor member having an insulated portion, and a support member carrying a plurality of contacts each located to correspond to a predetermined position of said one member, one of said members of the selector means having a simple harmonic motion corresponding to and in synchronous timed relation to the movement of the aforesaid member so that said insulated portion engages each contact during a rest period of their relative simple harmonic motion.

5. In an automatic selector apparatus, the combination with a pair of members relatively movable to a plurality of predetermined positions, and a simple harmonic operating means connected to one of said members for imparting simple harmonic motion thereto and timed to have rest periods corresponding to said predetermined positions, of a selector means controlling said operating means and comprising a plurality of contacts each located to correspond to a predetermined relative position of said member, and a movable conductor member engaging said contacts and having an insulated portion movable into engagement with said contacts, and a reducing operative connection between said movable member and said conductor member and for moving said conductor member in timed relation to said movable member but over a less distance.

6. In an automatic selector apparatus, the combination with a pair of members relatively movable to a plurality of predetermined positions, and an operating means connected to one of said members and for moving the same to any of the relative predetermined positions, of a selector means controlling said operating means and comprising a plurality of contact members each responsive to a manual operation and positioned each to correspond to a relative predetermined position of said one movable member, and a conductor member provided with an insulated portion and having a movement corresponding to the movement of said one movable member and for interrupting operation of said operating means when said insulated portion engages a contact member which has responded to a manual operation.

7. In an automatic selector apparatus, the combination with a pair of members relatively movable to a plurality of predetermined positions, and an operating means connected to one of said members and for moving the same to any of the relative predetermined positions, of a selector means controlling said operating means and comprising a plurality of contact members each located to correspond to a relative predetermined position of said one movable member, a plurality of manually operable switches movable when manually operated into connection with a corresponding contact member, and a conductor member provided with an insulated portion and having a movement corresponding to the movement of said one movable member and for interrupting a circuit through a manually operated switch when said insulated portion engages the contact member corresponding thereto.

8. In an automatic selector apparatus, the combination with a pair of members relatively movable to a plurality of predetermined positions, and an operating means connected to one of said members and for moving the same to any of the relative predetermined positions, of a selector means controlling said operating means and comprising a plurality of contact members each located to correspond to a relative predetermined position of said one movable member, a plurality of manually operable switches connected in series and each having a back contact engaged for connection to a corresponding contact member when the switch is manually operated to break said series connection, and a conductor member provided with an insulated portion and having a movement corresponding to the movement of said one movable member and for interrupting a circuit through a manually operated switch when said insulated portion engages the contact member corresponding thereto.

9. In an automatic selector apparatus, the combination with a pair of relatively movable members and an operating means for relatively moving said members in either of two directions into a plurality of predetermined relative positions, of a selector means comprising a conductor member having two conductor portions and an intermediate insulated portion and having a movement corresponding to that of one of said relatively movable members, a plurality of contacts each corresponding to a predetermined relative position of said member and each responsive to a manual operation, and including direction control means responsive to either of said conducting portions and for energizing said operating means for movement in the direction to move said insulated portion towards the contact member responding to a manual operation.

10. In an automatic selector apparatus, the combination with a pair of relatively movable members, and an operating means for relatively moving said members in either of two directions into a plurality of predetermined relative positions, of a selector means comprising a conductor member having two conductor portions and an intermediate insulated portion and having a movement corresponding to that of one of said relatively movable members, a plurality of contacts corresponding to a predetermined relative position of said member and each responsive to a manual operation, and including a pair of direction control contacts spaced at a distance greater than the movement of said conductor member to engage respective conductor portions thereof and for energizing said operating means to move said conductor member so that said insulated portion moves toward the contact member responding to a manual operation.

11. In an automatic multi-program projector, the combination with an objective, a carriage means adapted to carry a plurality of film programs, and a carriage operating means movable in either of two directions to position any one of said film programs in juxtaposition to said objective, a selector means comprising a conductor member having two conductor portions and an intermediate insulated portion and having a movement corresponding to the movement of said carriage means, and including a plurality of contact members each corresponding to a film program, each for engaging said conductor member, and a plurality of manually operable members for rendering one of said contact members operative, and a direction control means associated with said carriage operating means, including either of said conducting portions, and supervising movement of said carriage means and conductor member to move said insulated portion into juxtaposition with respect to the contact member rendered operative by one of said manually operable members.

12. In an automatic multi-program projector, the combination with an objective, a carriage means adapted to carry a plurality of film programs, and a carriage operating means movable in either of two directions to position any one of said film programs in juxtaposition to said objective, a selector means comprising a conductor member having two conducting portions and an intermediate insulated portion and having a movement corresponding to the movement of said carriage means, and including a plurality of contact members engaging said conductor member, a plurality of manually operable switches and a plurality of circuits, each switch, contact member and circuit corresponding to a film program and being rendered operative individually, and a pair of direction control circuits alternatively completed by one or the other of said conductor portions, each supervising movement of said carriage operating means in a direction corresponding to the operative conductor portions, and interrupted by movement of said insulated portion into engagement with the contact member corresponding to the selected manually operable switch and movement of the selected film program into alignment with said objective.

13. In an automatic multi-program projector, the combination with an objective, a carriage means adapted to carry a plurality of film programs, a carriage operating means for moving said carriage means to position any of said film programs in juxtaposition to said objective, a film advancing assembly movable to an operative position for engaging and advancing a juxtaposed film program and movable to an inoperative position out of engagement with any film program to permit movement of said carriage to bring another film program into position, and an assembly operating means for moving said film advancing assembly between said operative and inoperative positions, of a selector control circuit for supervising operation of said carriage operating means, and an assembly control circuit for supervising operation of said assembly operating means, said control circuits being adapted and arranged so as to be energized alternatively only.

14. In an automatic multi-program projector, the combination with an objective, a carriage means adapted to carry a plurality of film programs, a carriage operating means for moving said carriage means to position any of said film programs in juxtaposition to said objective, a film advancing assembly movable to an operative position for engaging and advancing a juxtaposed film program and movable to an inoperative position out of engagement with any film program to permit movement of said carriage to bring another film program into position, and an assembly operating means for moving said film advancing assembly between said operative and inoperative positions, of a control means having a pair of switches oppositely movable to closed and open positions, a selector control circuit including one of said switches and for supervising operation of said carriage operating means, and an assembly operating circuit including the other of said switches and for supervising operation of said assembly operating means, whereby only one of said circuits can be completed for each position of said switches.

15. In an automatic multi-program projector the combination with an objective, the carriage means adapted to carry a plurality of film programs, a carriage operating means for moving said carriage means to position any of said film programs in juxtaposition to said objective, a film advancing assembly movable to an operative position for engaging and advancing a juxtaposed film program and movable to an inoperative position out of engagement with any film program to permit movement of said carriage to bring another film program into position, and an assembly operating means for moving said film advancing assembly between said operative and inoperative positions, of a pair of relay assemblies each comprising a coil and a switch operated thereby, a selector control circuit including the coil of one and the switch of the other relay assembly and for supervising operation of said carriage operating means, and an assembly control circuit including the switch of said one and the coil of said other relay assembly and for supervising operation of said assembly operating means, whereby energization of either of said control circuits interrupts the other control circuit.

16. In an automatic multi-program projector, the combination with an objective, the carriage means adapted to carry a plurality of film programs, a carriage operating means for moving said carriage means to position any of said film programs in juxtaposition to said objective, a film advancing assembly movable to an operative position for engaging and advancing a juxtaposed film program and movable to an inoperative position out of engagement with any film program so that said carriage can move another film program into position, and an assembly operating means for moving said film advancing assembly between said operative and inoperative positions, of a selector control circuit for supervising operation of said carriage operating means, an assembly control circuit for supervising operation of said assembly operating means, and delayed action means between said circuits providing a preference to energization of said selector control circuit.

17. In an automatic multi-program projector, the combination with an objective, a carriage means adapted to carry a plurality of film programs, a carriage operating means for moving said carriage means to position any of said film programs in juxtaposition to said objective, a film advancing assembly movable to an operative position for engaging and advancing a juxtaposed film program and movable to an inoperative position out of engagement with any film program so that said carriage can move another film program into position, and an assembly operating means for moving said film advancing assembly between said operative and inoperative positions, of a delayed action relay including a coil and normally closed switch opened thereby after an interval following energization of said coil, a selector control circuit including said switch and having two legs each including the coil of a direct acting relay and for supervising the operation and direction of said carriage operating means, and an assembly control circuit including in series a pair of normally closed switches respectively opened by said direct action relay coils and the coil of said delayed action relay and for supervising operation of said assembly operating means.

18. In an automatic multi-program projector, the combination with a film handling unit adapted to support a film program, a film advancing assembly carrying a driving means and a drum rotated thereby and for engaging and advancing said film program, and an assembly operating means for moving said film advancing assembly to an inoperative position and to an operating position, of a control circuit including a switch which is open during movement of said film advancing assembly toward said operating position, an assembly operating circuit responsive to said control circuit, having one leg completed for movement of said assembly from inoperative to operating position and including a switch which is open to render said assembly operating means inoperative upon movement of said film advancing assembly into said operating position, and having another leg completed for movement of said assembly from operating to inoperative position and including a switch which is open upon movement of said film advancing assembly into said inoperative position, and a film advance operating circuit connected to said driving means of the film advancing assembly and including a switch which is open upon movement of said film advancing assembly to said inoperative position and closed upon movement thereof to and toward said operating position.

19. In an automatic multi-program projector, the combination with a film handling unit adapted to carry a film program, a film advancing assembly movable to operative and inoperative positions with respect to said film program, and an assembly operating means for moving said assembly to and from said operative and inoperative positions, of a control means having a pair of switches oppositely movable to closed and open positions, an assembly operating circuit connected to said assembly operating means, having one leg completed upon closing of one of said switches of the control means and including a switch located to be opened upon movement of said assembly to its operative position, and having a second leg including the other switch of said control means and a switch closed upon movement of said assembly from its inoperative position.

20. In an automatic multi-program projector, the combination with a film handling unit adapted to carry a film program, a film advancing assembly movable from an inoperative position to an operative position with respect to said film program, and an assembly operating means for moving said assembly from its inoperative position to said operative position, of an assembly operating circuit connected to said assembly operating means and including a switch member adapted when opened by movement of said assembly to its operative position to render said assembly operating means inoperative, and a projection control circuit also including said switch member and closed thereby when said assembly is in its said operative position.

21. In an automatic multi-program projector, the combination with a film handling unit adapted to carry a film program, a film advancing assembly movable from an inoperative position to an operative position with respect to said film program, and an assembly operating means for moving said assembly from its operative position to its inoperative position, of a projection control circuit including a switch member closed when said film advancing assembly is in operative position, and an assembly operating circuit connected to said assembly operating means and also including said switch member which is adapted upon movement of said film advancing assembly from operative position to interrupt said projection control circuit and to complete said assembly operating circuit.

22. In an automatic multi-program projector, the combination with a film handling unit adapted to support a film program, a film advancing assembly movable to an operating position and to an extreme inoperative position with respect to said film program, and an assembly operating means for moving said film advancing assembly to said positions, of an assembly operating circuit connected to said assembly operating means to energize the same for movement of said assembly from operative to inoperative position and including a switch member located to be opened by movement of said assembly to said extreme inoperative position.

23. In an automatic multi-program projector, the combination with a film handling unit adapted to carry a film program, a film advancing assembly movable to operating and inoperative positions with respect to said film program and including a movable member spaced from said film program during inoperative position of said assembly and for engaging and moving said film program during operating position of said assembly, and a film operating means for actuating said movable member on said film advancing assembly, of a film operating circuit connected to said film operating means and including a switch for energizing said film operating circuit and means and closed upon engagement with a film program and movement of said assembly to said operating position.

24. In an automatic multi-program projector, the combination with a film handling unit adapted to support a film program, a film advancing assembly movable to an operating position, an inoperative position, and intermediate positions with respect to said film program, and an assembly operating means for moving said film advancing assembly to said positions, of a control relay, and a holding circuit for said relay, including a switch arranged to be opened when said film advancing assembly is in certain intermediate positions adjacent said operative position, and including a film operated switch means having a member arranged to engage said film strip and close said film operated switch means when said film advancing assembly is in certain intermediate positions adjacent said operative position and before the first-mentioned switch is opened.

25. In an automatic multi-program projector, the combination with a film handling unit adapted to carry a film program, a film advancing assembly movable to and from an operating position with respect to said film program, a film switch means on said film advancing assembly and having a member adapted to engage a film program and to close said switch means while said assembly is being moved toward said operating position, and an assembly operating means for moving said film advancing assembly to and from said operating position, of a control relay, and an assembly operating circuit connected to said assembly operating means, rendered operative upon energization of said control relay and for energizing said assembly operating means to move said film advancing assembly into operating position, and a holding circuit connected to said control relay and including said film switch means which is opened to interrupt movement of said assembly to operating position when a film program is not in position.

26. In an automatic multi-program projector, the combination with a film handling unit adapted to carry a film program, a film advancing assembly movable to and from an operating position with respect to said film program, a film switch means on said film advancing assembly and having a member adapted to engage a film program and to close said switch means while said assembly is being moved toward said operating position, and an assembly operating means for moving said film advancing assembly to and from said operating position, of a control relay, and assembly operating circuit connected to said assembly operating means, having one leg rendered operative and another leg rendered inoperative upon energization of said control relay and for energizing said assembly operating means to move said film advancing assembly respectively into and out of said operating position, and a holding circuit connected to said control relay, adapted when completed to condition said one leg of the assembly operating circuit for completion, and adapted when interrupted to condition said other leg of the assembly operating circuit for completion.

27. In an automatic multi-program projector, the combination with a film handling unit adapted to carry a film program, which is provided with a structural variation, a film advancing assembly spaced from said film program during inoperative position of said assembly and movable to an operating position with respect to said film program, a film switch means on said film advancing assembly and having a member adapted to engage said film program and to close said film switch means when said assembly is in operating position, and an assembly operating means for moving said film advancing assembly to and from said operating position, of a control relay, an assembly operating circuit connected to said assembly operating means, rendered inoperative by energization of said control relay and for energizing said assembly operating means to move said assembly out of operating position, and a holding circuit connected to said control relay and including said film switch means which is adapted to be opened by said structural variation on said film program.

MARY A. ENGELKEN.
Executrix of the Estate of Richard C. Engelken, Deceased.

REFERENCES CITED

The following references are of record in the file of this patent:

UNITED STATES PATENTS

| Number | Name | Date |
|---|---|---|
| 2,175,185 | Ellsworth | Oct. 10, 1939 |
| 1,915,613 | O'Neill | June 27, 1933 |
| 2,206,134 | Streychmans | July 2, 1940 |
| 2,330,036 | Eakins | Sept. 21, 1943 |
| 2,318,118 | Warner et al. | May 4, 1943 |
| 2,002,352 | Owens | May 21, 1935 |
| 2,109,627 | Finch | Mar. 1, 1938 |
| 2,196,730 | Hooker | Apr. 9, 1940 |
| 2,269,952 | Morgan | Jan. 13, 1942 |
| 2,227,259 | Hokanson | Dec. 31, 1940 |
| 2,256,739 | Graves | Sept. 23, 1941 |
| 890,936 | Sandell | June 16, 1908 |
| 2,214,468 | Lannerd | Sept. 10, 1940 |
| 637,904 | Swaab et al. | Nov. 28, 1899 |
| 1,405,884 | Winterburn | Feb. 7, 1922 |
| 2,075,989 | Jonnert et al. | Apr. 6, 1937 |
| 918,884 | Mills | Apr. 20, 1909 |
| 1,084,651 | McFeely | Jan. 20, 1914 |
| 1,412,110 | Fullenlove | Apr. 11, 1922 |
| 2,101,890 | Andres | Dec. 14, 1937 |
| 2,136,322 | Sebastiani | Nov. 8, 1938 |
| 2,322,489 | Von Madaler | June 22, 1943 |
| Re. 22,707 | McMahon et al. | Jan. 15, 1946 |